United States Patent
Nakamori

(10) Patent No.: US 9,413,938 B2
(45) Date of Patent: Aug. 9, 2016

(54) IMAGE CAPTURING APPARATUS

(71) Applicant: CANON KABUSHIKI KAISHA, Tokyo (JP)

(72) Inventor: Kanae Nakamori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/749,427

(22) Filed: Jun. 24, 2015

(65) Prior Publication Data

US 2015/0381862 A1    Dec. 31, 2015

(30) Foreign Application Priority Data

Jun. 27, 2014    (JP) .................................. 2014-133282

(51) Int. Cl.
*H04N 5/225* (2006.01)

(52) U.S. Cl.
CPC .................................... *H04N 5/2254* (2013.01)

(58) Field of Classification Search
CPC .................................................... H04N 5/2254
USPC .................. 348/357, 373–375, 240.99, 240.3
See application file for complete search history.

(56) References Cited

U.S. PATENT DOCUMENTS

| | | | | |
|---|---|---|---|---|
| 5,148,199 A * | 9/1992 | Kohmoto | ................. | G02B 7/10 396/86 |
| 8,928,800 B2 * | 1/2015 | Yuge | ..................... | H04N 5/225 348/240.1 |
| 2002/0015593 A1 * | 2/2002 | Kai | ........................ | G03B 17/02 396/419 |
| 2010/0208122 A1 * | 8/2010 | Yumiki | .................. | G02B 7/021 348/333.08 |
| 2013/0100344 A1 * | 4/2013 | Kikuchi | ............... | G03B 17/566 348/375 |
| 2014/0111686 A1 * | 4/2014 | Iikawa | ................... | G03B 17/14 348/374 |
| 2014/0184903 A1 * | 7/2014 | Takahashi | ............ | H04N 5/2254 348/374 |

FOREIGN PATENT DOCUMENTS

JP    2004-343283 A    12/2004

* cited by examiner

*Primary Examiner* — Sinh Tran
*Assistant Examiner* — Zhenzhen Wu
(74) *Attorney, Agent, or Firm* — Canon USA, Inc., IP Division

(57) ABSTRACT

A base member holds a first ring-shaped operating member such that the first ring-shaped operating member can move rectilinearly in a direction perpendicular to the optical axis of a lens unit and holds a second ring-shaped operating member such that the second ring-shaped operating member can rotate about the optical axis of the lens unit. When the rotation of the second ring-shaped operating member is not detected by a rotation detection unit, a restricting unit permits rectilinear movement of the first ring-shaped operating member, and when the rotation of the second ring-shaped operating member is detected by the rotation detection unit, the restricting unit restricts the rectilinear movement of the first ring-shaped operating member.

10 Claims, 16 Drawing Sheets

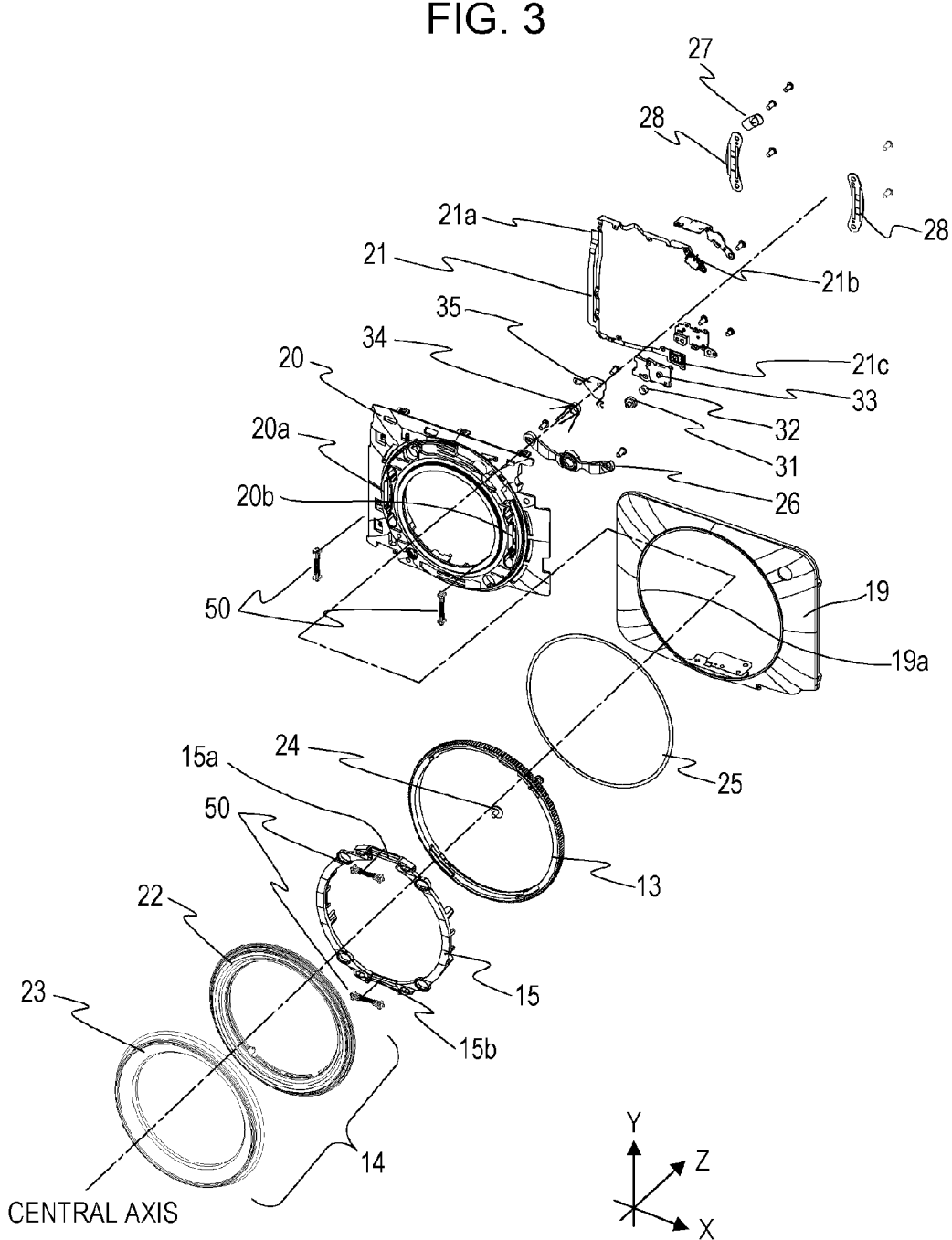

IMAGE CAPTURING APPARATUS

BACKGROUND OF THE INVENTION

1. Field of the Invention

The invention relates to an image capturing apparatus.

2. Description of the Related Art

A known camera in the related art includes a lateral-position release button at a position that a forefinger can easily reach when the camera is held at a lateral position and a vertical-position release button at a position that the forefinger can easily reach when the camera is held at a vertical position (see Japanese Patent Laid-Open No. 2004-343283).

However, when the lateral-position release button or the vertical-position release button is in a downward direction, the camera disclosed in Japanese Patent Laid-Open No. 2004-343283 has to be held, with the wrist twisted, thus making it very difficult to take a photograph.

SUMMARY OF THE INVENTION

The applicant proposes an image capturing apparatus in which a slidable first ring-shaped operating member and a rotatable second ring-shaped operating member are disposed around a lens unit. With this image capturing apparatus, a release operation is performed by sliding a first ring-shaped operating member, and a zooming operation is performed by rotating the second ring-shaped operating member.

The invention provides an image capturing apparatus including a lens unit; a first ring-shaped operating member disposed around the lens unit; a second ring-shaped operating member disposed around the lens unit; a base member configured to hold the first ring-shaped operating member and the second ring-shaped operating member; a rotation detection unit configured to detect rotation of the second ring-shaped operating member; and a restricting unit configured to restrict rectilinear movement of the first ring-shaped operating member. The base member holds the first ring-shaped operating member such that the first ring-shaped operating member can move rectilinearly in a direction perpendicular to an optical axis of the lens unit. The base member holds the second ring-shaped operating member such that the second ring-shaped operating member can rotate about the optical axis of the lens unit. When the rotation of the second ring-shaped operating member is not detected by the rotation detection unit, the restricting unit permits rectilinear movement of the first ring-shaped operating member. When the rotation of the second ring-shaped operating member is detected by the rotation detection unit, the restricting unit restricts the rectilinear movement of the first ring-shaped operating member.

Further features of the invention will become apparent from the following description of exemplary embodiments with reference to the attached drawings.

BRIEF DESCRIPTION OF THE DRAWINGS

FIG. 3 is an exploded perspective view of the front cover unit viewed from the front of the digital camera.

DESCRIPTION OF THE EMBODIMENTS

Embodiments of the invention will be described hereinbelow with reference to the attached drawings.

Figure 1A:
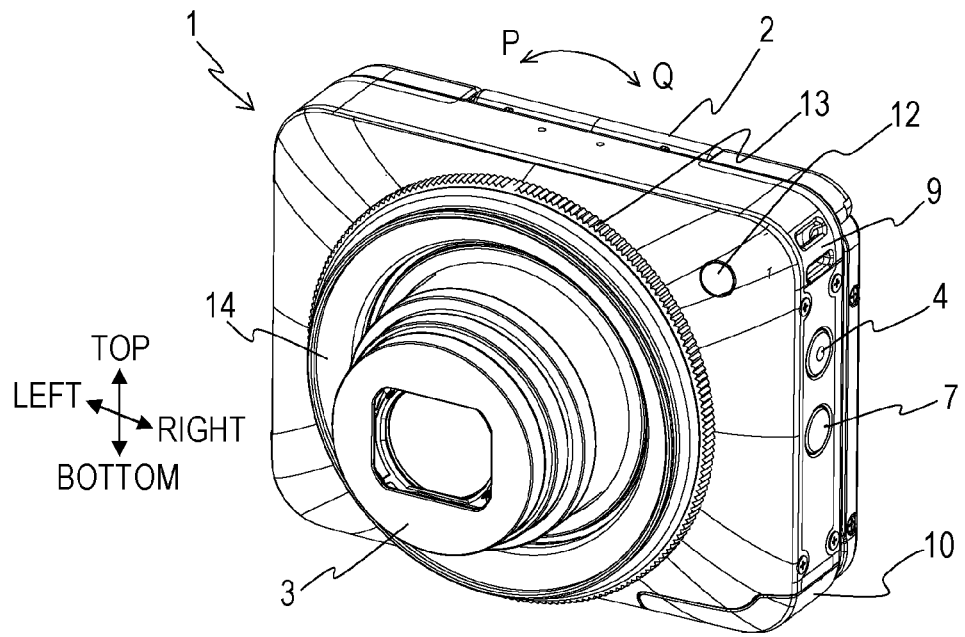
FIG. 1A is an external perspective view of a digital camera, which is an example of an image capturing apparatus according to an embodiment of the invention, viewed from the front.
Figure 1B:
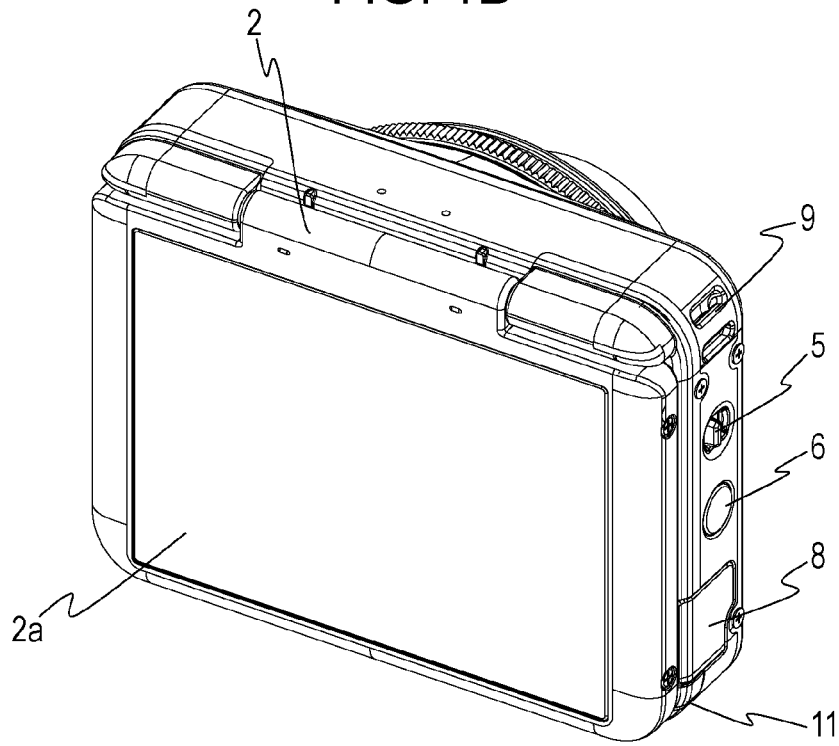
FIG. 1B is an external perspective view of the digital camera viewed from the back.

FIGS. 1A and 1B are external perspective views of a digital camera, which is an example of an image capturing apparatus according to an embodiment of the invention.

FIG. 1A is an external perspective view of the digital camera viewed from the front (an object side). FIG. 1B is an external perspective view of the digital camera viewed from the back (a user side).

FIGS. 1A and 1B show an image capturing state in which a lens unit 3 is brought out. When the digital camera is brought into a stand-by state, the lens unit 3 is collapsed to a position at which it does not protrude from a camera body (apparatus main body) 1.

A display unit 2 is supported so as to be rotatable in a predetermined angle range relative to the camera body 1 with a hinge mechanism and is electrically connected to the camera body 1 with a flexible wiring board. FIGS. 1A and 1B show a state in which the display unit 2 is closed to the camera body 1.

A display unit 2a is a liquid crystal panel unit or the like and displays an image for checking the composition of a captured image and a playback image. The display unit 2a incorporates a capacitance touch panel.

In the image capturing state in which the lens unit 3 is extended, an object image is formed on an image sensor. The operation state of the digital camera is switched between the image capturing state and the stand-by state by pressing a power button 4. When the digital camera is brought into the image capturing state by pressing the power button 4, the operation mode of the digital camera comes into an image capturing mode.

When the digital camera is in the image capturing mode, an image capturing operation mode of the digital camera is selected by operating a mode switch lever 5. Operating a communication button 6 starts wireless communication, such as Wi-Fi.

Pressing a playback button 7 when the digital camera is in an image capturing state switches the operation mode of the digital camera from the image capturing mode to a playback mode. Pressing the playback button 7 when the digital camera is in the stand-by state starts the digital camera in the playback mode.

A terminal cover 8 is supported so as to be slidable and rotatable relative to the camera body 1. When the terminal cover 8 is opened, external connection terminals, such as a USB terminal and an HDMI® terminal, are exposed.

A strap base 9 is a strap base through which a strap is to be passed, which is provided at two locations at the left and right side of the camera. A battery lid 10 is held so as to be slidable and rotatable relative to the camera body 1. When the battery lid 10 is opened, a battery can be put in and out.

A card cover 11 is mounted so as to be slidable and rotatable relative to the camera body 1. When the card cover 11 is opened, a recording medium can be put in and out.

An illumination window 12 is made of a transparent member, which guides and scatters light emitted from a light emitting element disposed in the camera. The light emitting element emits light during image capturing at low-light intensity and during an autofocus (AF) operation at low-light intensity.

A zoom ring 13 is shaped like a ring, which is disposed around the lens unit 3. The zoom ring 13 is configured to rotate relative to the camera body 1 within a predetermined angle range about the optical axis of the lens unit 3 in P-direction and Q-direction (see FIG. 1A).

When the zoom ring 13 is rotated in the P-direction, the focal length of the lens unit 3 zooms in a telephoto direction, and when rotated in the Q-direction, the focal length of the lens unit 3 zooms in a wide-angle direction. When the user rotates the zoom ring 13 and then releases the finger from the zoom ring 13, the zoom ring 13 returns to its neutral position (initial position) due to a torsion spring 34. The zoom ring 13 corresponds to a second ring-shaped operating member.

The zoom ring 13 has surface irregularities around the outer periphery thereof so as to help the user securely hold the zoom ring 13.

A release ring 14 is shaped like a ring, which is disposed around the lens unit 3. The outside diameter of the release ring 14 is smaller than the outside diameter of the zoom ring 13. The release ring 14 is disposed so as to protrude further forward from the digital camera than the zoom ring 13. The release ring 14 can be slid relative to the camera body 1 in a predetermined range in upward, downward, leftward, and rightward directions perpendicular to the optical axis of the lens unit 3 (see FIG. 1A).

Sliding the release ring 14 in a vertical direction, that is, sliding the release ring 14 downward and upward, allows a release operation to be executed, allowing still image capturing.

Similarly, sliding the release ring 14 in a lateral direction, that is, sliding the release ring 14 leftward and rightward, allows a release operation to be executed, allowing still image capturing. The moving range of the release ring 14 is within the outside diameter of the zoom ring 13 in a direction perpendicular to the optical axis of the lens unit 3. The release ring 14 corresponds to a first ring-shaped operating member.

In general, the release switch of a digital camera is a two-step switch. When a first-step switch (SW1) is turned on at the first stroke of the release switch, an autofocus (AF) operation and an automatic exposure (AE) operation are executed. When a second-step switch (SW2) is turned on at the second stroke of the release switch, still image capturing is executed.

The release ring 14 can be slid only within a predetermined range in the vertical and lateral directions. The release ring 14 is configured to return to the neutral position (initial position) due to a spring force when a vertical sliding operation or a lateral sliding operation is canceled.

FIGS. 1A and 1B show a state in which the zoom ring 13 and the release ring 14 are at the neutral position.

Next, the configuration of the zoom ring 13 and the release ring 14 will be described in detail.

Figure 2A:
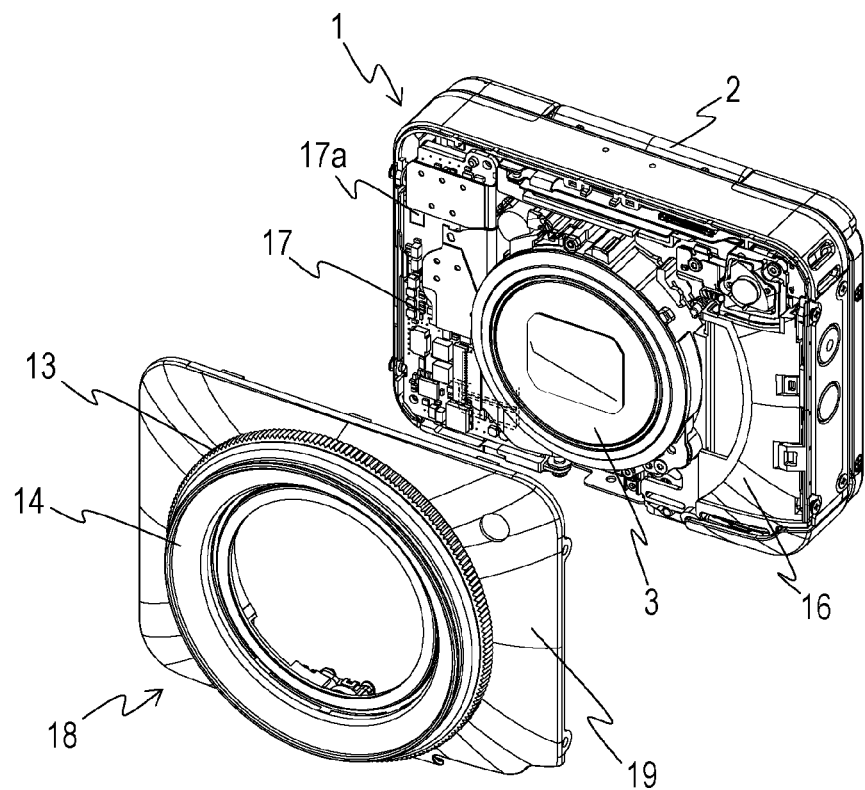
FIG. 2A is a partially exploded perspective view of a front cover unit of the digital camera viewed from the front.
Figure 2B:
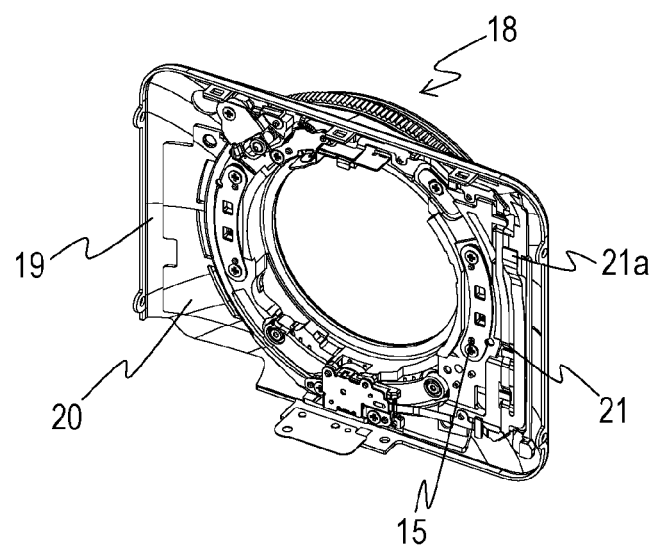
FIG. 2B is a perspective view of the front cover unit detached from a camera body, viewed from the back.

FIGS. 2A and 2B are partially exploded perspective views of a front cover unit 18 of the digital camera viewed from the front. FIG. 2A shows a state in which the front cover unit 18 is detached from the camera body 1. FIG. 2B is a perspective view of the front cover unit 18 detached from the camera body 1, viewed from the back.

As shown in FIG. 2A, a battery chamber 16 in which a battery for supplying power to the camera is disposed on the right of the lens unit 3 in the camera body 1, and a main circuit board 17 on which a main CPU and so on are mounted is disposed on the left of the lens unit 3. The main circuit board 17, the display unit 2, and the lens unit 3 are electrically connected together with a flexible wiring board. The main circuit board 17 has a connector 17a thereon for connecting a front flexible wiring board 21 mounted to the front cover unit 18.

The front cover unit 18 includes a front cover 19, a front inner 20, the front flexible wiring board 21, the zoom ring 13, and the release ring 14.

The front cover 19 is formed by drawing a metal material. The front cover 19 has an opening 19a (see FIG. 3) at the center. The front inner 20 is made of a synthetic resin material. The front inner 20 is bonded to the back of the front cover 19 in such a manner that part of the front inner 20 is exposed from the opening 19a of the front cover 19.

The front inner 20 has an opening 20k at the center. When the front cover unit 18 is mounted to the camera body 1, part of the lens unit 3 is positioned in the opening 20k of the front inner 20. When the power of the camera body 1 is turned on, part of the lens unit 3 extends from the opening 20k of the front inner 20.

The front inner 20 functions as a base member for holding the zoom ring 13 and the release ring 14. The zoom ring 13 is configured to rotate in a predetermined range relative to the front inner 20. The release ring 14 is configured to be slid in a predetermined range relative to the front inner 20.

The front inner 20 is fitted with the front flexible wiring board 21. The front flexible wiring board 21 is provided with a switch that accepts execution of a release operation and a switch that accepts execution of a zooming operation. The front flexible wiring board 21 has, at an end, a contact connecting portion 21a from which a partial pattern is exposed. The contact connecting portion 21a of the front flexible wiring board 21 is connected to the connector 17a of the main circuit board 17. This allows signals output from the individual switches by the operations of the zoom ring 13 and the release ring 14 to be transmitted to the main CPU mounted on the main circuit board 17.

Next, the detailed configuration of the front cover unit 18 will be described with reference to FIG. 3 to FIGS. 7A to 7C.

Figure 4:
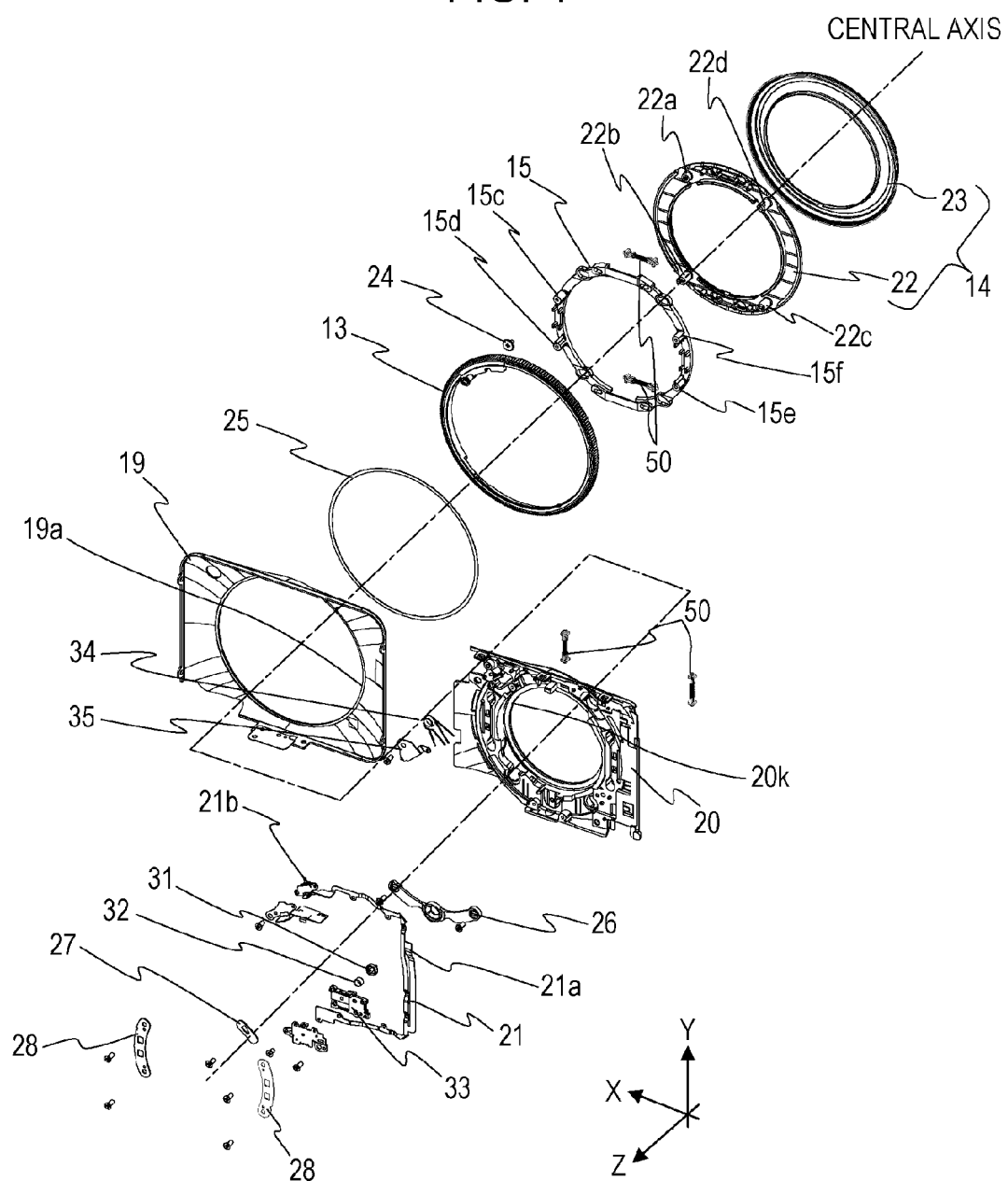
FIG. 4 is an exploded perspective view of the front cover unit viewed from the back of the digital camera.

FIG. 3 is an exploded perspective view of the front cover unit 18 viewed from the front of the digital camera. FIG. 4 is an exploded perspective view of the front cover unit 18 viewed from the back of the digital camera.

The front flexible wiring board 21 is mounted to the back of the front inner 20. The front flexible wiring board 21 is provided with a zoom switch 21b for detecting the rotating operation of the zoom ring 13. The zoom switch 21b has a tilting portion that can tilt in opposite two directions. When the zoom ring 13 is rotated in a telephoto direction, the tilting portion of the zoom switch 21b tilts in a first direction. When the zoom ring 13 is rotated in a wide-angle direction, the tilting portion of the zoom switch 21b tilts in a second direction. A signal output from the zoom switch 21b is transmitted to the main CPU mounted on the main circuit board 17 for execution of a zooming operation.

The front flexible wiring board 21 is further provided with a release switch 21c for detecting the vertical sliding operation and the lateral sliding operation of the release ring 14. The release switch 21c is a two-step switch. When the release ring 14 is slid in one of the vertical and lateral directions to turn on a first-step switch of the release switch 21c, an SW1 signal is transmitted to the main CPU mounted on the main circuit board 17 to execute an AF operation and an AE operation. When the release ring 14 is further slid in the same direction, a second-step switch of the release switch 21c is turned on, and an SW2 signal is transmitted to the main CPU mounted on the main circuit board 17 to execute still image capturing. The SW1 signal is one example of a first signal, and the SW2 signal is one example of a second signal.

In this exemplary embodiment, the SW1 signal and the SW2 signal are output from the release switch 21c no matter in which direction of the vertical and lateral directions the release ring 14 is operated. The front inner 20 functions as a base member. The release ring 14 functions as an operating member capable of sliding in a first direction (the vertical direction in FIG. 1A, the Y-direction in FIG. 3) and in a second direction (the lateral direction perpendicular to the first direction in FIG. 1A, the X-direction in FIG. 3) relative to the front inner 20. The release switch 21c functions as a switch.

The front inner 20 is fitted with the torsion spring 34 at the back. The torsion spring 34 is a spring for returning the zoom ring 13 to the neutral position. An arm of the torsion spring 34 is hooked to a spring hook of the front inner 20 and the zoom ring 13. The torsion spring 34 is mounted to the back of the front inner 20 in such a manner that the boss of the front inner 20 is inserted into the end coil of the torsion spring 34 and thereafter, a spring holding member 35 is fixed to the boss of the front inner 20. Fixing the spring holding member 35 to the back of the front inner 20 brings the torsion spring 34 between the front inner 20 and the spring holding member 35, preventing the torsion spring 34 from coming off the front inner 20.

The front cover 19 is bonded to the front of the front inner 20. Spring units 50 are mounted to the front part of the front inner 20 exposed from the opening 19a of the front cover 19. The spring units 50 are mounted at the left and right of the opening 20k of the front inner 20.

Figure 5:
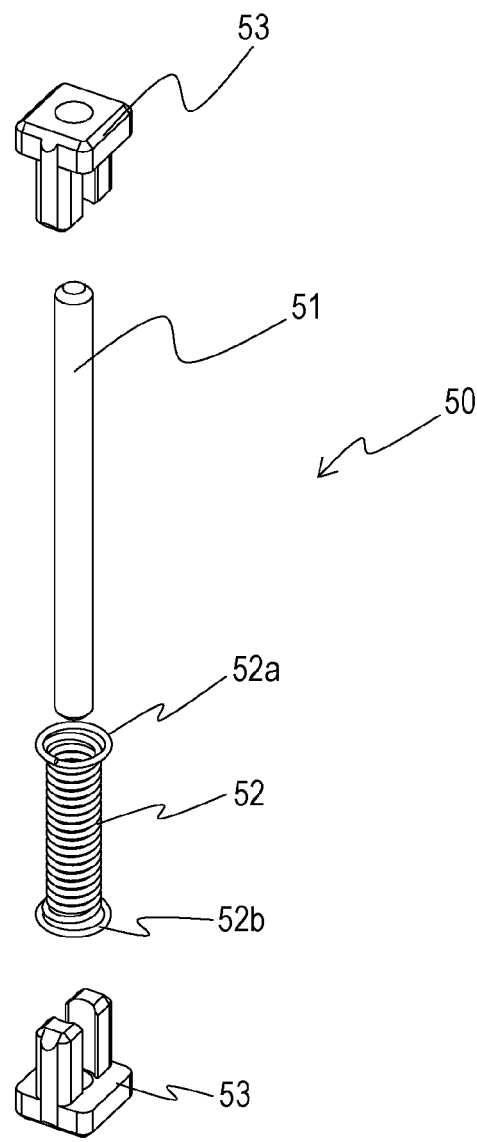
FIG. 5 is an exploded perspective view of a spring unit.

FIG. 5 is an exploded perspective view of one of the spring units 50. The spring unit 50 includes a metal shaft 51, a coil spring 52, and engaging members 53. The spring unit 50 is configured such that the coil spring 52 is mounted on the metal shaft 51, and that the engaging members 53 are attached to the metal shaft 51 so as to be disposed at both ends of the coil spring 52. The inside diameters of an upper coil end 52a and a lower coil end 52b of the coil spring 52 are larger than the inside diameter of a central portion of the coil spring 52. The engaging members 53 are made of a synthetic resin material, which are attached to the metal shaft 51 so as to be in contact with the upper coil end 52a and the lower coil end 52b of the coil spring 52, respectively. When the engaging members 53 are attached to the metal shaft 51, both ends of the metal shaft 51 project through the engaging members 53. The central portion of the coil spring 52 is guided by the metal shaft 51. The clearance between the outer circumference of the metal shaft 51 and the inner circumference of the central portion of the coil spring 52 is small enough to cause no problem in operation. This reduces generation of vibration sound due to the interference between the outer circumference of the metal shaft 51 and the inner circumference of the coil spring 52.

Recessed portions 20a and 20b for accommodating the spring units 50 are provided at the front of the front inner 20 exposed from the opening 19a of the front cover 19. The spring-accommodating recessed portion 20a is provided at the left of the opening 20k of the front inner 20, and the spring-accommodating recessed portion 20b is provided at the right of the opening 20k of the front inner 20. The spring-accommodating recessed portions 20a and 20b are each fitted with the spring unit 50. Of the spring unit 50, the engaging members 53 attached to both ends of the metal shaft 51 engage with the spring-accommodating recessed portion 20a or 20b. At that time, the spring unit 50 is attached to the spring-accommodating recessed portion 20a or 20b, with the coil spring 52 compressed.

Figure 6:
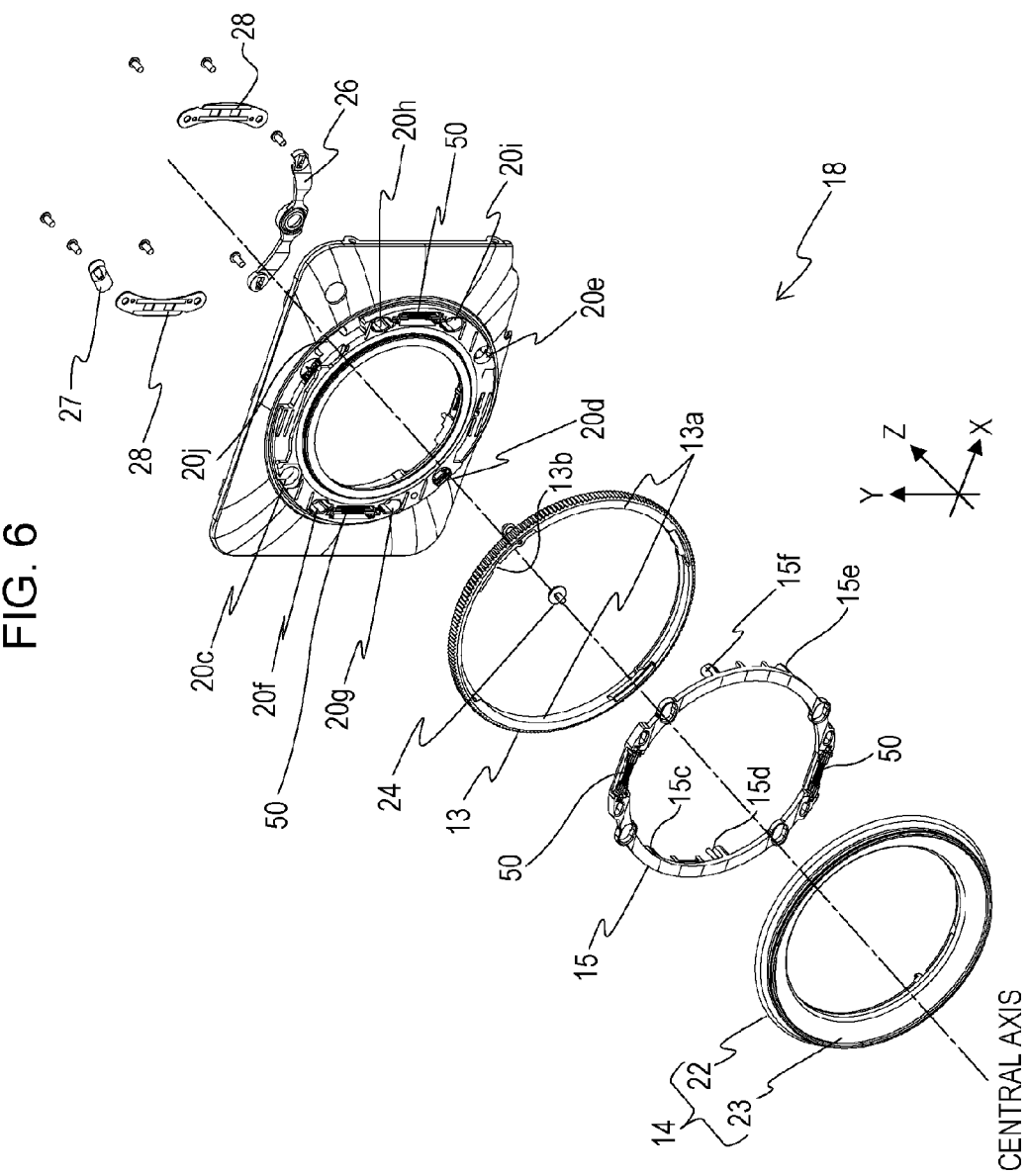
FIG. 6 is an exploded perspective view of the front cover unit in a state in which the spring unit is fitted in each of spring-accommodating recessed portions of a front inner.

FIG. 6 is an exploded perspective view of the front cover unit 18 in a state in which the front flexible wiring board 21 and the torsion spring 34 are attached to the back of the front inner 20, and the spring units 50 are fitted in the spring-accommodating recessed portions 20a and 20b of the front inner 20.

Figure 7A:
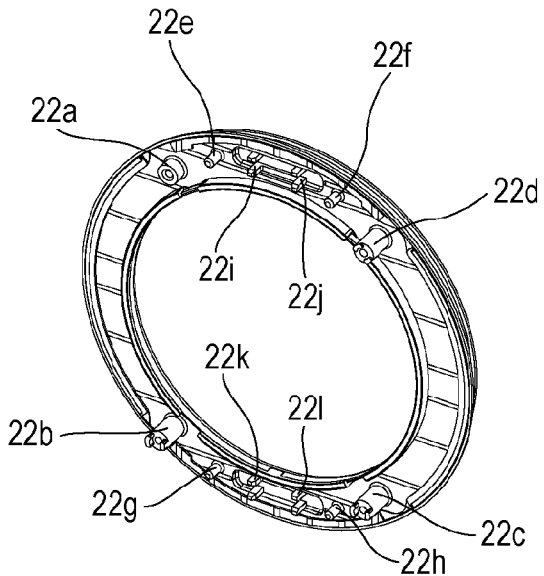
FIG. 7A is a perspective view illustrating a release base.
Figure 7B:
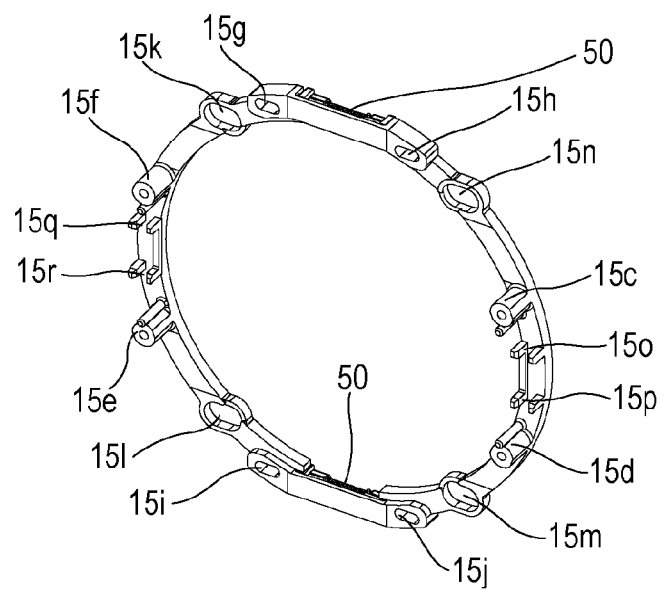
FIG. 7B is a perspective view illustrating a Y-direction moving ring.
Figure 7C:
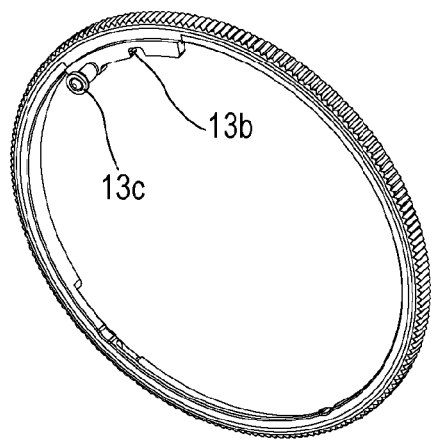
FIG. 7C is a perspective view illustrating a zoom ring.

FIGS. 7A to 7C are perspective views illustrating a release base 22, a Y-direction moving ring 15, and the zoom ring 13, respectively.

The release ring 14 is configured such that the release base 22 made of a synthetic resin material and a release cap 23 made of a metal material are bonded together in terms of design and intensity. Both the release base 22 and the release cap 23 have a ring shape.

The zoom ring 13 is disposed at the front part of the front inner 20 exposed from the opening 19a of the front cover 19. As shown in FIGS. 3 and 4, a sliding sheet 25 is bonded to the back of the zoom ring 13. As shown in FIG. 7C, the zoom ring 13 has a cutout portion 13b through which the zoom switch 21b is turned on and off. As shown in FIG. 7C, the zoom ring 13 further has a spring hook 13c. The spring hook 13c of the zoom ring 13 passes through a hole 20j formed in the front inner 20 into contact with the arm of the torsion spring 34. This allows the zoom ring 13 to be urged to the neutral position by the torsion spring 34.

The Y-direction moving ring 15 is attached to the front part of the front inner 20 exposed from the opening 19a of the front cover 19 and inside the zoom ring 13 so as to be movable only in the Y-direction. As shown in FIG. 7B, shafts 15c, 15d, 15e, and 15f project from the back of the Y-direction moving ring 15. Long holes 20f, 20g, 20h, and 20i are formed at the front part of the front inner 20 exposed from the opening 19a of the front cover 19. The shafts 15c, 15d, 15e, and 15f are inserted into the long holes 20f, 20g, 20i, and 20h, respectively. The long holes 20f, 20g, 20i, and 20h have an elongate hole shape long in the Y-direction. This allows the Y-direction moving ring 15 to move only in the Y-direction. The Y-direction moving ring 15 functions as a moving member that is attached to the front inner 20 so as to be movable only in the first direction. The shafts 15c, 15d, 15e, and 15f and the long holes 20f, 20g, 20i, and 20h function as a first guide unit that guides the Y-direction moving ring 15 only in the first direction (Y-direction) relative to the front inner 20.

After the shafts 15c, 15d, 15e, and 15f are inserted into the long holes 20f, 20g, 20i, and 20h, holding plates 28 are fixed to the shafts 15c, 15d, 15e, and 15f passing through the front inner 20 with screws. Thus, the Y-direction moving ring 15 is mounted to the front inner 20, with the front inner 20 held between the Y-direction moving ring 15 and the holding plates 28.

As shown in FIG. 7B, the Y-direction moving ring 15 has engaging portions 15o, 15p, 15q, and 15r projecting from the back thereof. When the Y-direction moving ring 15 is mounted to the front inner 20, the engaging members 53 attached to the spring-accommodating recessed portion 20a and the engaging portions 15o and 15p engage with each other. When the Y-direction moving ring 15 is mounted to the front inner 20, the engaging members 53 attached to the spring-accommodating recessed portion 20b and the engaging portions 15q and 15r engage with each other. When the Y-direction moving ring 15 is mounted to the front inner 20, the engaging portions 15o and 15q come into contact with the upper coil ends 52a of the coil springs 52 of the spring units 50 attached to the spring-accommodating recessed portions 20a and 20b, respectively, and the engaging portions 15p and 15r come into contact with the lower coil ends 52b of the coil springs 52 of the spring units 50 attached to the spring-accommodating recessed portions 20a and 20b, respectively.

This causes the Y-direction moving ring 15 to be urged to the neutral position in the Y-direction by the spring units 50 attached to the spring-accommodating recessed portions 20a and 20b. With the Y-direction moving ring 15 mounted to the front inner 20, the spring units 50 attached to the spring-accommodating recessed portions 20a and 20b are disposed in the projection plane of the Y-direction moving ring 15. The spring units 50 attached to the spring-accommodating recessed portions 20a and 20b function as first urging members that urge the Y-direction moving ring 15 to the neutral position in the movable range of the Y-direction moving ring 15.

The Y-direction moving ring 15 has spring-accommodating recessed portions 15a and 15b at the front (see FIG. 3). The spring-accommodating recessed portion 15a is formed at the upper part of the Y-direction moving ring 15, and the spring-accommodating recessed portion 15b is formed at the lower part of the Y-direction moving ring 15. The spring-accommodating recessed portions 15a and 15b are each fitted with the spring unit 50. Of the spring unit 50, the engaging members 53 attached to the both ends of the metal shaft 51 engage with the spring-accommodating recessed portion 15a or 15b. At that time, the spring unit 50 is attached to the spring-accommodating recessed portion 15a or 15b, with the coil spring 52 compressed.

The release base 22 is mounted to the front of the Y-direction moving ring 15 so as to be movable only in the X-direction. As shown in FIG. 7A, the release base 22 has shafts 22e, 22f, 22g, and 22h projecting from the back thereof. As shown in FIG. 7B, the Y-direction moving ring 15 has long holes 15g, 15h, 15i, and 15j. The shafts 22e, 22f, 22g, and 22h are inserted into the long holes 15g, 15h, 15i, and 15j, respectively. The long holes 15g, 15h, 15i, and 15j have an elongate hole shape long in the X-direction. This allows the release base 22 to be moved only in the X-direction relative to the Y-direction moving ring 15. The release base 22 functions as an operating member that is attached to the Y-direction moving ring 15 so as to be movable only in the second direction. The shafts 22e, 22f, 22g, and 22h and the long holes 15g, 15h, 15i, and 15j function as a second guide unit that guides the release base 22 only in the second direction (X-direction) relative to the Y-direction moving ring 15.

As shown in FIG. 7A, the release base 22 has shafts 22a, 22b, 22c, and 22d projecting from the back thereof. As shown in FIG. 7B, the Y-direction moving ring 15 has long holes 15k, 15l, 15m, and 15n. The shafts 22a, 22b, 22c, and 22d are inserted into the long holes 15k, 15l, 15m, and 15n, respectively. The long holes 15k, 15l, 15m, and 15n have an elongate hole shape long in the X-direction. This allows the release base 22 to move only in the X-direction relative to the Y-direction moving ring 15. The shaft 22a passing through the long hole 15k is fitted with a screw 24. The Y-direction moving ring 15 is held between the release base 22 and the screw 24. The shafts 22a, 22b, 22c, and 22d and the long holes 15k, 15l, 15m, and 15n function as a second guide unit that guides the release base 22 only in the second direction (X-direction) relative to the Y-direction moving ring 15.

The shaft 22b is inserted into the long hole 15l and a hole 20e formed in the front inner 20. The shaft 22c is inserted into the long hole 15m and a hole 20d formed in the front inner 20. A cam 26 is fixed to the shaft 22b passing through the long hole 15l and the hole 20e and the shaft 22c passing through the long hole 15m and the hole 20d with screws. Thus, the release base 22 and the cam 26 are integrated, with the Y-direction moving ring 15 and the front inner 20 held between the release base 22 and the cam 26. That is, the cam 26 functions as a cam that can slide with the release base 22.

The shaft 22d is inserted into the long hole 15n and a hole 20c formed in the front inner 20. A holding plate 27 is fixed to the shaft 22d passing through the long hole 15n and the hole 20c with a screw. Thus, the Y-direction moving ring 15 and the front inner 20 are held between the release base 22 and the holding plate 27.

As shown in FIG. 7A, the release base 22 has engaging portions 22i, 22j, 22k, and 22l projecting from the back thereof. When the release base 22 is attached to the Y-direction moving ring 15, the engaging members 53 attached to the spring-accommodating recessed portion 15a and the engaging portions 22i and 22j engage with each other. When the release base 22 is attached to the Y-direction moving ring 15, the engaging members 53 attached to the spring-accommodating recessed portion 15b and the engaging portions 22k and 22l engage with each other. When the release base 22 is attached to the Y-direction moving ring 15, the engaging portions 22i and 22k come into contact with the upper coil ends 52a of the coil springs 52 of the spring units 50 attached to the spring-accommodating recessed portions 15a and 15b, respectively, and the engaging portions 22j and 22l come into contact with the lower coil ends 52b of the coil springs 52 of the spring units 50 attached to the spring-accommodating recessed portions 15a and 15b, respectively.

This causes the release base 22 to be urged to the neutral position in the X-direction by the spring units 50 attached to the spring-accommodating recessed portions 15a and 15b. With the release base 22 attached to the Y-direction moving ring 15, the spring units 50 attached to the spring-accommodating recessed portions 15a and 15b are disposed in the projection plane of the release base 22. Since the Y-direction moving ring 15 is disposed in the projection plane of the release base 22, the spring units 50 attached to the spring-accommodating recessed portions 15a and 15b are also disposed in the projection plane of the release base 22. The spring units 50 attached to the spring-accommodating recessed portions 15a and 15b function as second urging members that urge the release base 22 to the neutral position in the operating range of the release base 22.

When the release ring 14 is slid in the X-direction, the release base 22 is slid in the X-direction relative to the Y-direction moving ring 15. At that time, the Y-direction moving ring 15 does not slide relative to the front inner 20. When the release ring 14 is slid in the Y-direction, the release ring 14 composed of the release base 22 and the release cap 23 and the Y-direction moving ring 15 slide together relative to the front inner 20. At that time, the release base 22 does not slide relative to the Y-direction moving ring 15.

Figure 8A:
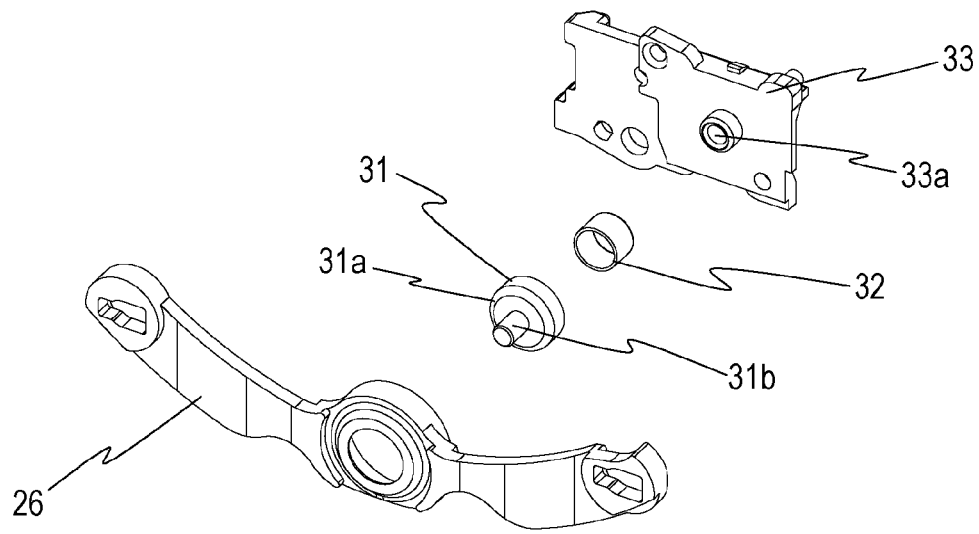
FIG. 8A is an exploded perspective view illustrating the shapes of a cam, a pushing member, an urging spring, and a guide member viewed from the front.
Figure 8B:
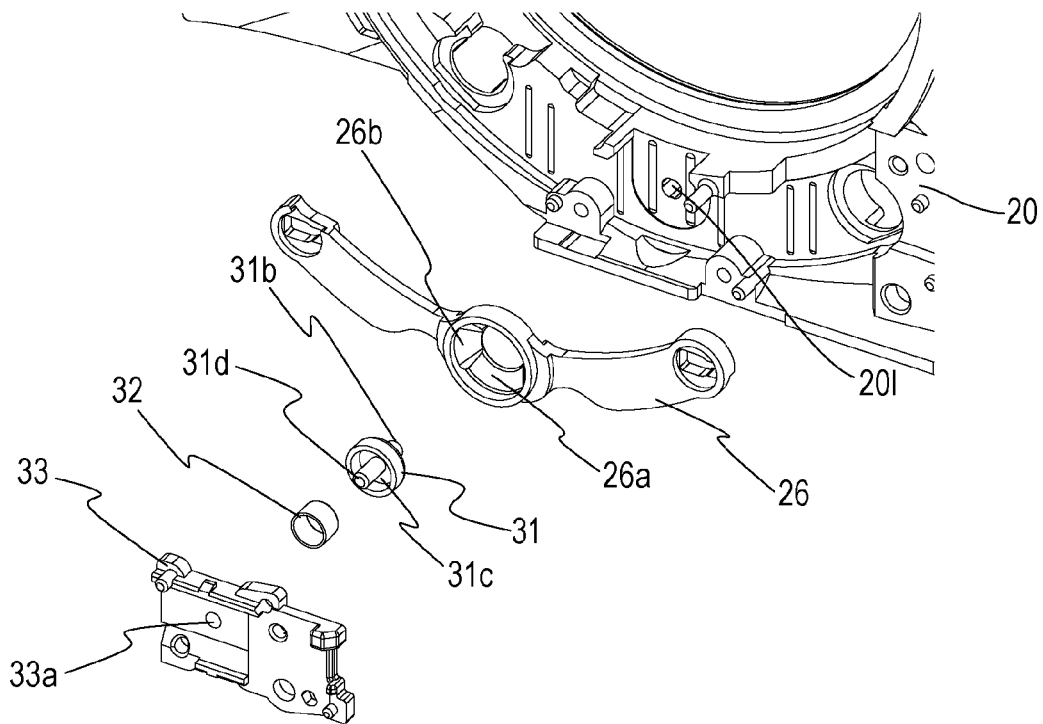
FIG. 8B is an exploded perspective view illustrating the shapes of the front inner, the cam, the pushing member, the urging spring, and the guide member viewed from the back.

FIGS. 8A and 8B are exploded perspective views illustrating the shapes of the cam 26, a pushing member 31, an urging spring 32, and a guide member 33. FIG. 8A is an exploded perspective view of the cam 26, the pushing member 31, the urging spring 32, and the guide member 33 viewed from the front. In FIG. 8A, the front inner 20 is omitted. FIG. 8B is an exploded perspective view of the front inner 20, the cam 26, the pushing member 31, the urging spring 32, and the guide member 33 viewed from the back.

As shown in FIG. 8B, the cam 26 has cam portions 26a and 26b in a substantially basin-like shape at the back thereof. The pushing member 31 is disposed at the back of the cam 26. The pushing member 31 has a sliding portion 31a, a first shaft 31b, a recessed portion 31c, and a second shaft 31d. As shown in FIG. 8B, the first shaft 31b projects from the sliding portion 31a to the front, and the second shaft 31d projects from the sliding portion 31a to the back. The recessed portion 31c is recessed from the back of the sliding portion 31a.

When the pushing member 31 is disposed on the back of the cam 26, the sliding portion 31a slides with the cam portions 26a and 26b of the cam 26. At that time, the first shaft 31b passes through the cam 26 into a guide hole 20l formed in the front inner 20.

The guide member 33 is disposed at the back of the pushing member 31. The guide member 33 has a guide hole 33a. The urging spring 32 is disposed in the recessed portion 31c of the pushing member 31, and the guide member 33 is fixed to the back of the front inner 20 with screws. At that time, the second shaft 31d of the pushing member 31 is inserted into the guide hole 33a. The pushing member 31 is attached between the front inner 20 and the guide member 33. This allows the pushing member 31 to move along the axial direction of the first shaft 31b and the second shaft 31d, pushing the sliding portion 31a to the cam portions 26a and 26b with the urging spring 32.

The release switch 21c mounted on the front flexible wiring board 21 is disposed on the back of the guide member 33. When the pushing member 31 moves against the urging spring 32, an end of the second shaft 31d pushes the release switch 21c. Since the end of the second shaft 31d pushes the release switch 21c by a first pushing amount, the first-step switch of the release switch 21c is turned on. By further pushing the release switch 21c by a second pushing amount with the end of the second shaft 31d, the second-step switch of the release switch 21c is turned on. Thus, the second shaft 31d functions as a shaft capable of pushing the release switch 21c.

Figure 9A:
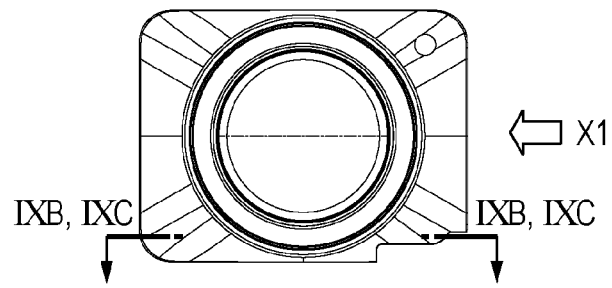
FIG. 9A is a diagram illustrating the motion of the pushing member when a release ring is slid in X1-direction.
Figure 9B:
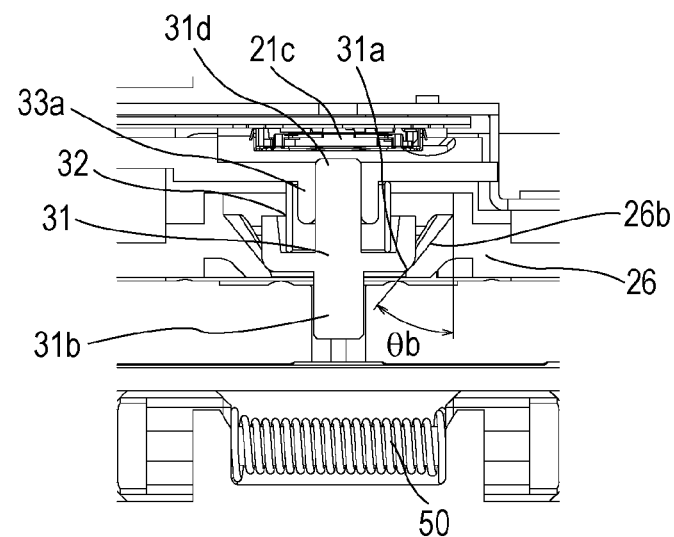
FIG. 9B is a diagram illustrating the motion of the pushing member when the release ring is slid in the X1-direction.
Figure 9C:
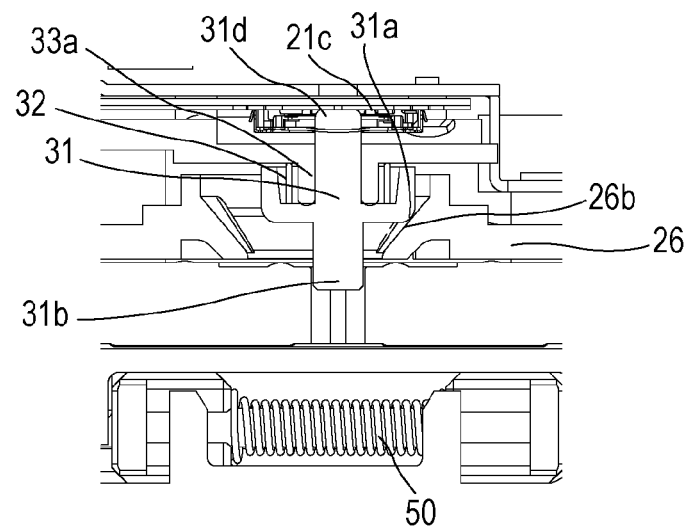
FIG. 9C is a diagram illustrating the motion of the pushing member when the release ring is slid in the X1-direction.

FIGS. 9A to 9C are diagrams illustrating the motion of the pushing member 31 when the release ring 14 is slid in X1-direction. FIG. 9A is a front view of the front cover unit 18. The X1-direction is defined by the arrow in FIG. 9A. FIG. 9B is a cross-sectional view of the front cover unit 18 taken along line IXB-IXB when the release ring 14 is at the neutral position. FIG. 9C is a cross-sectional view of the front cover unit 18 taken along line IXC-IXC when the release ring 14 is slid in the X1-direction from the neutral position.

As shown in FIG. 9B, when the release ring 14 is at the neutral position, the pushing member 31 is urged to the cam portions 26a and 26b of the cam 26 by the urging force of the urging spring 32. At that time, the end of the second shaft 31d is not in contact with the release switch 21c, so that a gap is present between the end of the second shaft 31d and the release switch 21c. When the release ring 14 is slid in the X1-direction from this state, the sliding portion 31a of the pushing member 31 slides on the cam 26b to move the pushing member 31 backward against the urging spring 32. When the pushing member 31 moves backward against the urging spring 32, the gap between the end of the second shaft 31d and the release switch 21c decreases gradually to bring the end of the second shaft 31d into contact with the release switch 21c, pushing the release switch 21c.

Figure 10A:
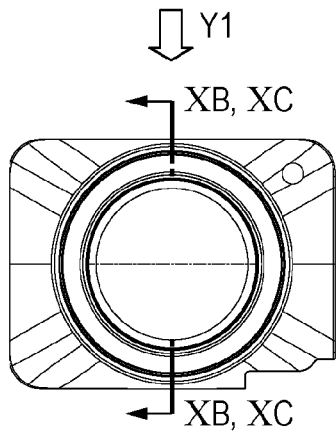
FIG. 10A is a diagram illustrating the motion of the pushing member when a release ring is slid in Y1-direction.
Figure 10B:
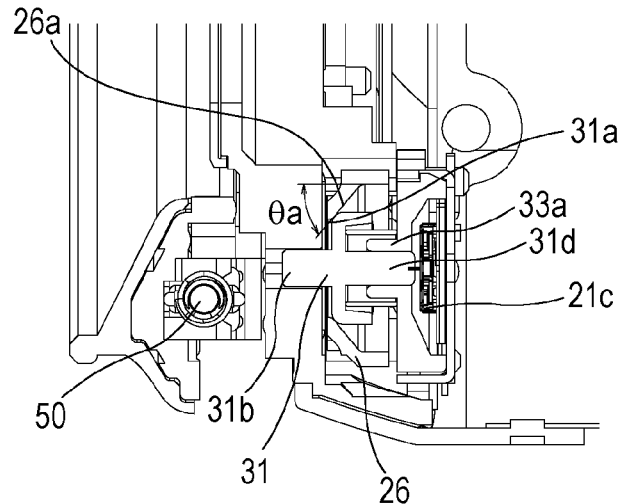
FIG. 10B is a diagram illustrating the motion of the pushing member when the release ring is slid in the Y1-direction.
Figure 10C:
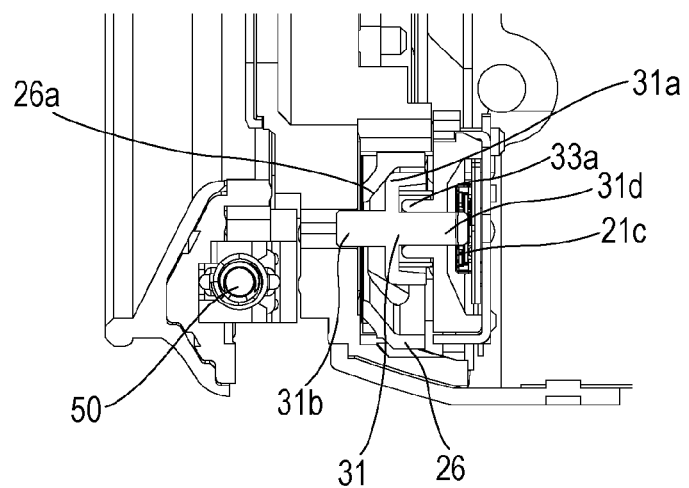
FIG. 10C is a diagram illustrating the motion of the pushing member when the release ring is slid in the Y1-direction.

FIGS. 10A to 10O are diagrams illustrating the motion of the pushing member 31 when the release ring 14 is slid in Y1-direction. FIG. 10A is a front view of the front cover unit 18. The Y1-direction is defined by the arrow in FIG. 10A. FIG. 10B is a cross-sectional view of the front cover unit 18 taken along line XB-XB when the release ring 14 is at the neutral position. FIG. 10O is a cross-sectional view of the front cover unit 18 taken along line XC-XC when the release ring 14 is slid in the Y1-direction from the neutral position.

As shown in FIG. 10B, when the release ring 14 is at the neutral position, the pushing member 31 is urged to the cam portions 26a and 26b of the cam 26 by the urging force of the urging spring 32. At that time, the end of the second shaft 31d is not in contact with the release switch 21c, so that a gap is present between the end of the second shaft 31d and the release switch 21c. When the release ring 14 is slid in the Y1-direction from this state, the sliding portion 31a of the pushing member 31 slides on the cam 26a to move the pushing member 31 backward against the urging spring 32. When the pushing member 31 moves backward against the urging spring 32, the gap between the end of the second shaft 31d and the release switch 21c decreases gradually to bring the end of the second shaft 31d into contact with the release switch 21c, pushing the release switch 21c.

Let θa be the inclination angle of the cam 26a relative to the moving direction of the pushing member 31 (Z-direction), and θb be the inclination angle of the cam 26b relative to the moving direction of the pushing member 31 (Z-direction). In this exemplary embodiment, the cam portions 26a and 26b are formed so that the amount of sliding operation necessary for the second shaft 31d to push the release switch 21c differs between a case where the release ring 14 is slid in the Y-direction and a case where it is slid in the X-direction.

In this exemplary embodiment, the cam portions 26a and 26b are formed so that the inclination angle θa is larger than the inclination angle θb. Thus, the amount of sliding operation of the release ring 14 necessary for the end of the second shaft 31d to push the release switch 21c is larger for the Y-direction than for the X-direction. In other words, when the release ring 14 is slid in the X-direction, the amount of sliding operation necessary for the end of the second shaft 31d to push the release switch 21c is relatively small. In contrast, when the release ring 14 is slid in the Y-direction, the amount of sliding operation necessary for the end of the second shaft 31d to push the release switch 21c is relatively large. The difference in inclination angle between the cam 26a and the cam 26b is smoothed at the boundary therebetween. This reduces a noticeable difference even if the release ring 14 is slid diagonally between the X-direction and the Y-direction.

The force necessary for the end of the second shaft 31d to push the release switch 21c increases as the amount of sliding necessary for the end of the second shaft 31d to push the release switch 21c decreases. The force necessary for the end of the second shaft 31d to push the release switch 21c decreases as the amount of sliding necessary for the end of the second shaft 31d to push the release switch 21c increases. In other words, the smaller the inclination angle is, the heavier the sliding operation on the release ring 14.

In this exemplary embodiment, sliding the release ring 14 in the X-direction needs only to slide the release base 22 relative to the Y-direction moving ring 15. Thus, even if the inclination angle θb of the cam 26b is decreased, the sliding operation on the release ring 14 does not become extremely heavy. In contrast, to slide the release ring 14 in the Y-direction, the release base 22 and the Y-direction moving ring 15 are slid relative to the front inner 20. Thus, the force necessary for sliding operation increases by the increased number of components to be slid. If the inclination angle θa of the cam 26a is decreased, the sliding operation on the release ring 14 may become extremely heavy.

In this exemplary embodiment, the inclination angles of the cam portions 26a and 26b are determined in consideration of this. In other words, the inclination angles of the cam portions 26a and 26b are determined so that the force for turning on the release switch 21c is substantially the same for sliding the release ring 14 in the X-direction and the Y-direction.

In this exemplary embodiment, when the release ring 14 is slid in the X-direction, the release ring 14 can be rotated about the first shaft 31b of the pushing member 31. In this case, the rotation of the release ring 14 is restricted by the contact of the shaft 22d of the release base 22 with the rim of the hole 20c of the front inner 20. That is, the shaft 22d of the release base 22 functions as a restriction unit that restricts the rotation of the release ring 14 relative to the front inner 20. The shaft 22d of the release base 22 is disposed so that the distance from the first shaft 31b of the pushing member 31 to the shaft 22d of the release base 22 is larger than the distance from the first shaft 31b of the pushing member 31 to the central position of the release base 22. Furthermore, the shaft 22d of the release base 22 is disposed at a position at which it is substantially point-symmetrical to the first shaft 31b of the pushing member 31 about the central position of the release base 22.

The diameter of the hole 20c is determined so that when the release base 22 is slid in the X-direction or the Y-direction, the shaft 22d and the rim of the hole 20c come into contact after the second-step switch of the release switch 21c is turned on. This prevents a problem that the second-step switch of the release switch 21c cannot be turned on due to the contact between the shaft 22d and the rim of the hole 20c.

Figure 11A:
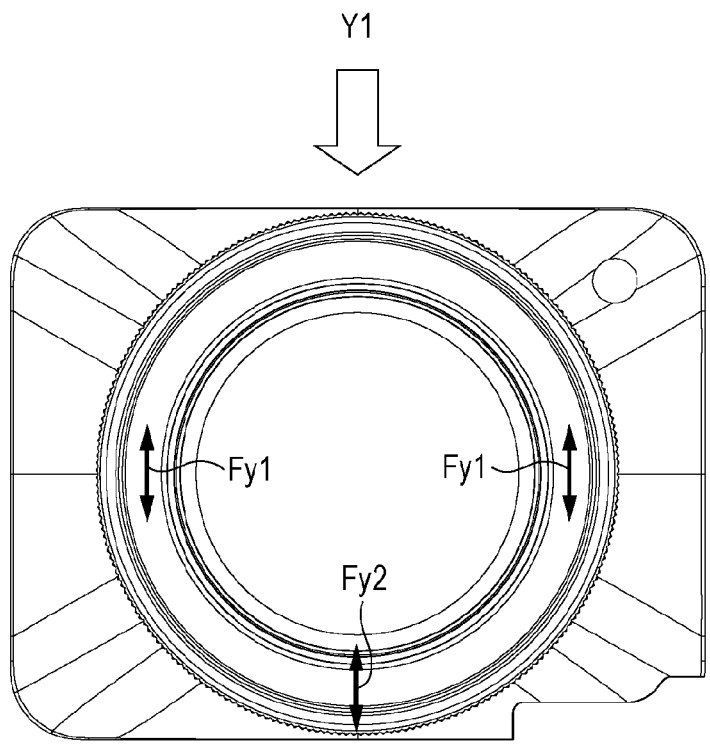
FIG. 11A is a diagram illustrating a force necessary for sliding the release ring in Y-direction.
Figure 11B:
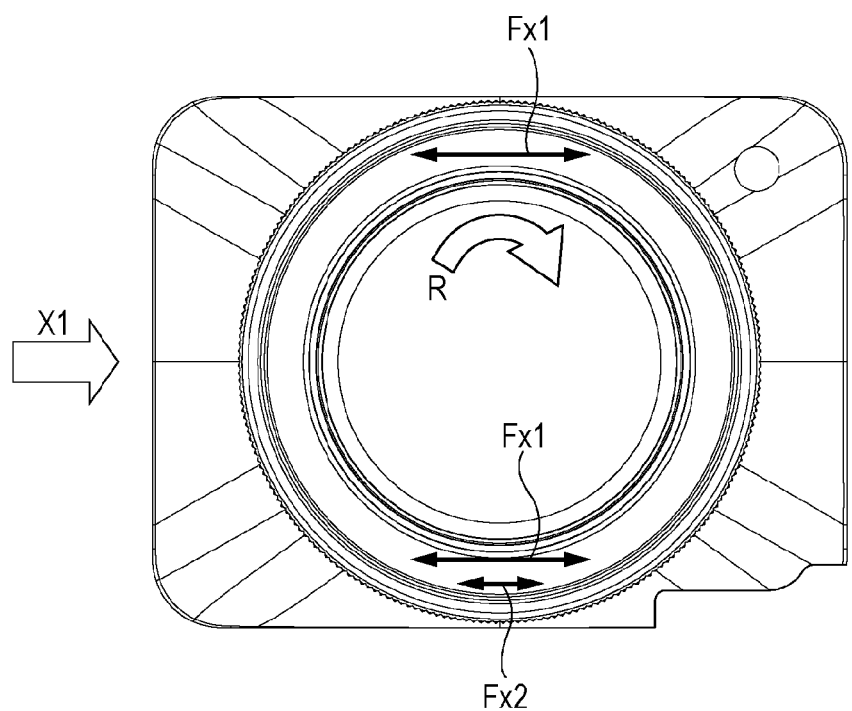
FIG. 11B is a diagram illustrating a force necessary for sliding the release ring in X-direction.

FIGS. 11A and 11B are diagrams illustrating forces necessary for sliding the release ring 14 in the Y-direction and the X-direction, respectively.

When the release ring 14 is at a neutral position in the Y-direction, the spring units 50 accommodated in the spring-accommodating recessed portions 20a and 20b urge the Y-direction moving ring 15 to the neutral position in the Y-direction, and the force of the sliding portion 31a to push the cam 26a urges the cam 26 to the neutral position in the Y-direction. FIG. 11A is a diagram illustrating a force that urges the release ring 14 to the neutral position in the Y-direction. In FIG. 11A, Fy1 denotes the force of the spring units 50 accommodated in the spring-accommodating recessed portions 20a and 20b to urge the Y-direction moving ring 15 to the neutral position in the Y-direction, and Fy2 denotes the force of the sliding portion 31a to push the cam 26a.

When the release ring 14 is at a neutral position in the X-direction, the spring units 50 accommodated in the spring-accommodating recessed portions 15a and 15b urge the release base 22 to the neutral position in the X-direction, and the force of the sliding portion 31a to push the cam 26b urges the cam 26 to the neutral position in the X-direction. FIG. 11B is a diagram illustrating a force that urges the release ring 14 to the neutral position in the X-direction. In FIG. 11B, Fx1 denotes the force of the spring units 50 accommodated in the spring-accommodating recessed portions 15a and 15b to push the release base 22 to the neutral position in the X-direction, and Fx2 denotes the force of the sliding portion 31a to push the cam 26b.

To slide the release ring 14 in the Y1-direction, the release ring 14 has to be slid in the Y1-direction against the urging force Fy1 of the spring units 50 accommodated in the spring-accommodating recessed portions 20a and 20b and the force Fy2 of the sliding portion 31a to push the cam 26a.

In this exemplary embodiment, the coil springs 52 of the spring units 50 are set so that the urging forces Fy1 of the spring units 50 accommodated in the spring-accommodating recessed portions 20a and 20b are the same on the right and left. The positions at which the cam 26 and the pushing member 31 are disposed are substantially the center in the lateral direction with respect to the release ring 14. Accordingly, as shown in FIG. 11A, when the release ring 14 is slid in the Y1-direction, the force of the sliding portion 31a to push the cam 26a is substantially equally divided in the lateral direction. Thus, the force that pushes the release ring 14 to the neutral position in the Y-direction is substantially equal on the left and right of the release ring 14.

To slide the release ring 14 in the X1-direction, the release ring 14 has to be slid in the X1-direction against the urging force Fx1 of the spring units 50 accommodated in the spring-accommodating recessed portions 15a and 15b and the force Fx2 of the sliding portion 31a to push the cam 26b.

In this exemplary embodiment, as shown in FIG. 10B, the cam 26 and the pushing member 31 are disposed at positions at which they are aligned with the spring unit 50 accommodated in the lower spring-accommodating recessed portion 15b in the Z-direction.

That is, the cam 26 and the pushing member 31 are disposed lower than the release ring 14. Accordingly, as shown in FIG. 11B, the urging force Fx1 of the spring unit 50 accommodated in the lower spring-accommodating recessed portion 15b and the force Fx2 of the sliding portion 31a to push the cam 26b act on substantially the same position of the release ring 14. In contrast, the upper part of the release ring 14 is acted upon only by the urging force Fx1 of the spring unit 50 accommodated in the spring-accommodating recessed portion 15a.

Assume that the coil spring 52 of the spring unit 50 accommodated in the upper spring-accommodating recessed portion 15a and the coil spring 52 of the spring unit 50 accommodated in the lower spring-accommodating recessed portion 15b have the same spring constant. In this case, the force acting on the lower part of the release ring 14 is larger than the force acting on the upper part of the release ring 14 by the force Fx2 of the sliding portion 31a to push the cam 26b. At that time, when the release ring 14 is slid in the X1-direction, as shown in FIG. 11B, the upper part of the release ring 14 moves earlier than the lower part of the release ring 14, causing the release ring 14 to rotate in the direction of arrow R in FIG. 11B.

Taking this into account, this exemplary embodiment is configured such that the resultant of the urging force Fx1 of the lower spring unit 50 and the force Fx2 of the sliding portion 31a to push the cam 26b is substantially equal to the urging force Fx1 of the upper spring unit 50. That is, the urging force of the lower spring unit 50 is set smaller than the urging force of the upper spring unit 50. This makes the force acting on the upper part of the release ring 14 and the force acting on the lower part of the release ring 14 substantially equal, preventing the release ring 14 from rotating in the direction indicated by the arrow R in FIG. 11B even if the release ring 14 is slid in the X1-direction. The upper spring unit 50 corresponds to an urging member (or a first urging member) disposed on one side of the first ring-shaped operating member, and the lower spring unit 50 corresponds to a second urging member disposed on the other side of the first ring-shaped operating member.

Figure 12A:
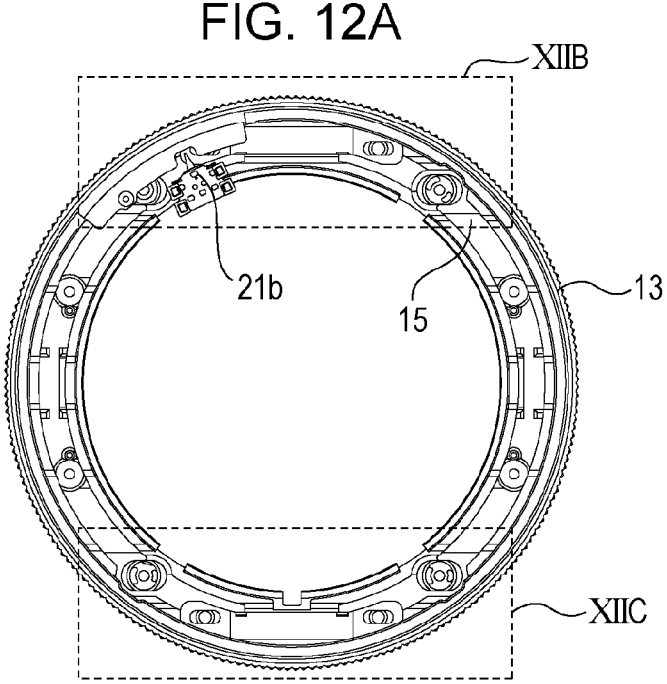
FIG. 12A is an overall view of the zoom ring, the Y-direction moving ring, a zoom switch, and the release base.

FIGS. 12A to 16C are diagrams illustrating the state of the zoom ring 13, the Y-direction moving ring 15, the zoom switch 21b, and the release base 22. FIGS. 12A to 12B show a state in which the zoom ring 13 is at the neutral position. FIG. 12A is an overall view of the zoom ring 13, the Y-direction moving ring 15, the zoom switch 21b, and the release base 22. FIG. 12B is an enlarged view of part XIIB, which is the upper part of the zoom ring 13 shown in FIG. 12A. FIG. 12C is an enlarged view of part XIIC, which is the lower part of the zoom ring 13 shown in FIG. 12A. As shown in FIGS. 12A and 12B, the zoom ring 13 has the cutout portion 13b through which the zoom switch 21b is turned on and off. When the zoom ring 13 is rotated from the neutral position in the P-direction or the Q-direction, an end 13b1 of the cutout portion 13b comes into contact with a lever 21b1 of the zoom switch 21b to tilt the lever 21b1 in the P-direction or the Q-direction. Since the lever 21b1 tilts in the P-direction or the Q-direction, the zoom switch 21b outputs a zoom signal.

Figure 12B:
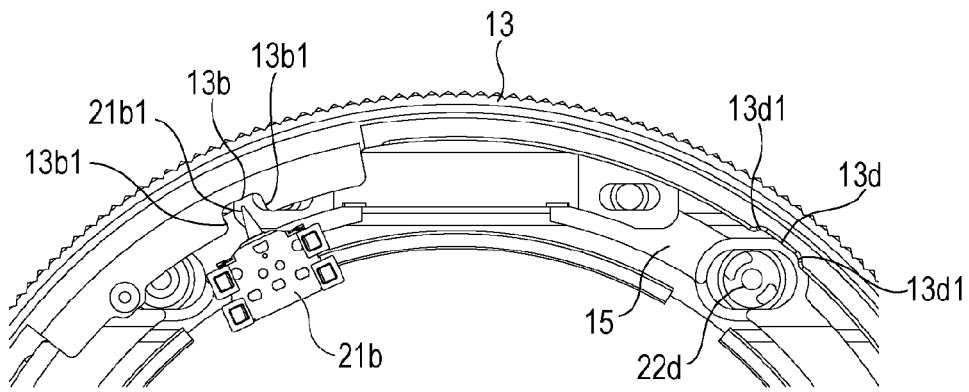
FIG. 12B is an enlarged view of part XIIB of the zoom ring shown in FIG. 12A.
Figure 12C:
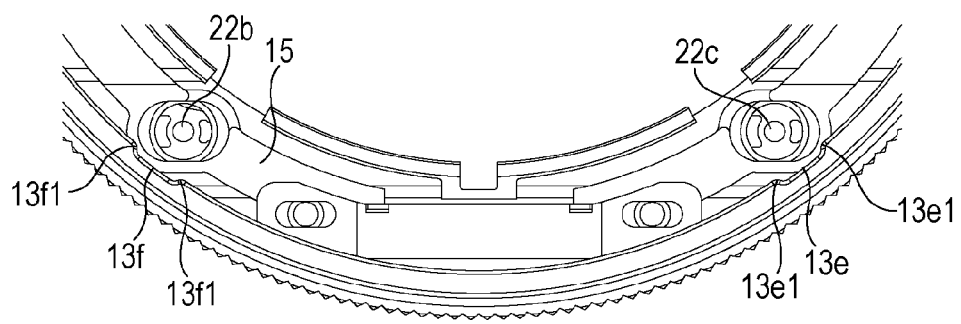
FIG. 12C is an enlarged view of part XIIC of the zoom ring shown in FIG. 12A.

As shown in FIGS. 12A to 12C, the zoom ring 13 has cutout portions 13d, 13e, and 13f. As shown in FIG. 12B, the cutout portion 13d is formed at a position corresponding to the shaft 22d when the zoom ring 13 is at the neutral position. As shown in FIG. 12C, the cutout portion 13e is formed at a position corresponding to the shaft 22c, and the cutout portion 13f is formed at a position corresponding to the shaft 22b when the zoom ring 13 is at the neutral position.

Figure 13A:
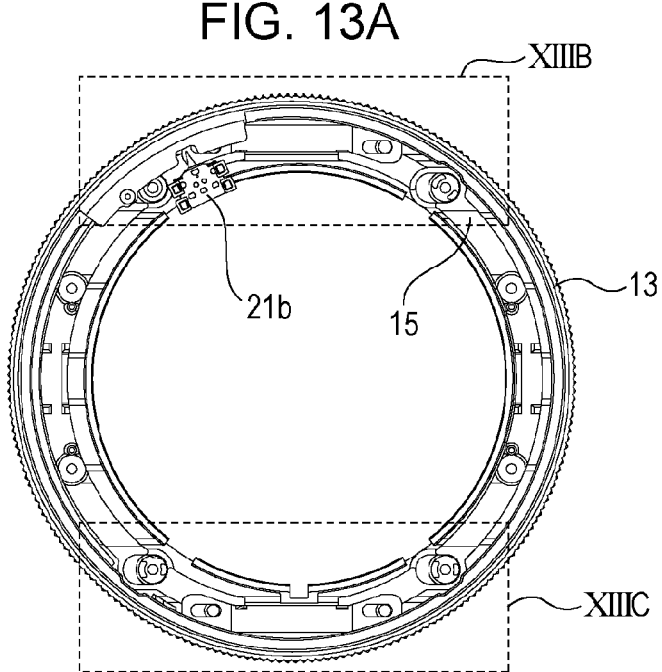
FIG. 13A is an overall view of the zoom ring, the Y-direction moving ring, the zoom switch, and the release base.
Figure 13B:
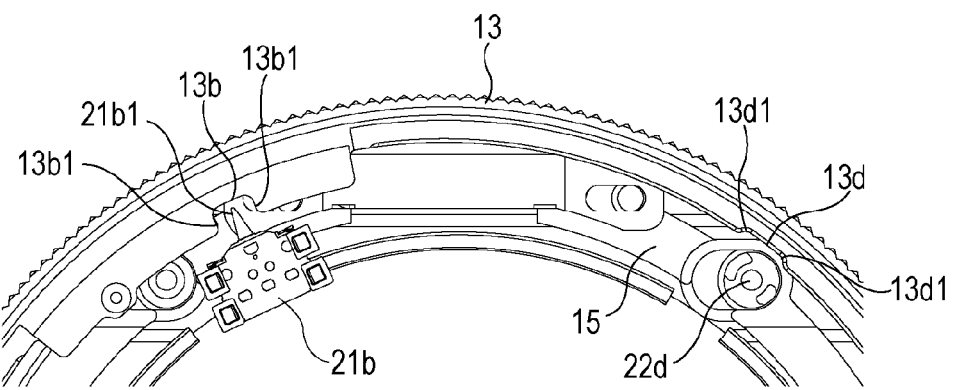
FIG. 13B is an enlarged view of part XIIIB of the zoom ring shown in FIG. 13A.
Figure 13C:
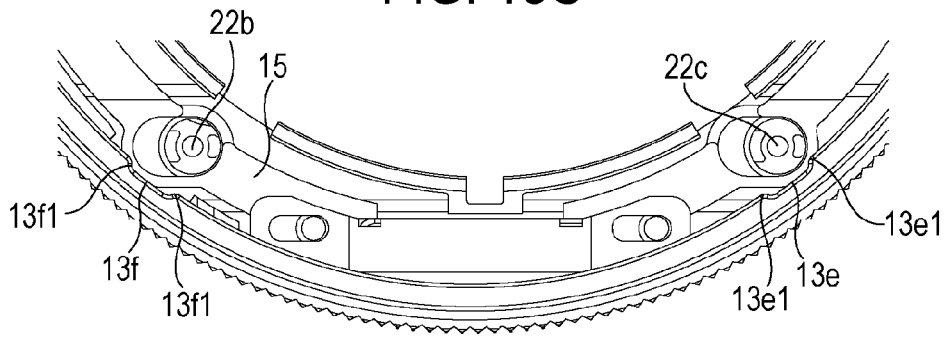
FIG. 13C is an enlarged view of part XIIIC of the zoom ring shown in FIG. 13A.

FIGS. 13A to 13C are diagrams illustrating a state in which the release ring 14 is slid in the X1-direction when the zoom ring 13 is at the neutral position. FIG. 13A is an overall view corresponding to FIG. 12A in which the release ring 14 is slid in the X1-direction when the zoom ring 13 is at the neutral position. FIG. 13B is an enlarged view of part XIIIB, which is the upper part of the zoom ring 13 shown in FIG. 13A. FIG. 13C is an enlarged view of part XIIIC, which is the lower part of the zoom ring 13 shown in FIG. 13A.

When the release ring 14 is slid in the X1-direction, the release base 22 slides in the X1-direction relative to the zoom ring 13. At that time, as shown in FIGS. 13B and 13C, the shaft 22d comes into the cutout portion 13d, and the shaft 22c comes into the cutout portion 13e. This allows the release base 22 to be slid in the X1-direction relative to the zoom ring 13. That is, this permits sliding of the release base 22 in the X1-direction.

Figure 14A:
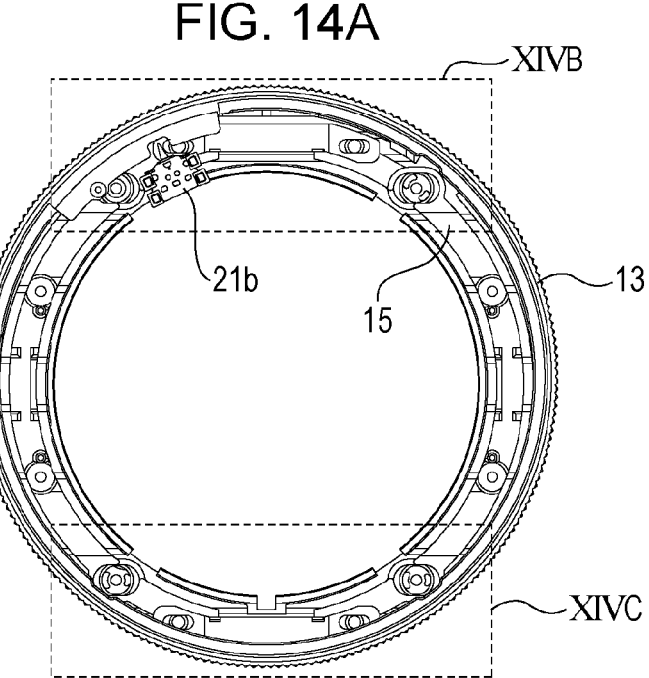
FIG. 14A is an overall view of the zoom ring, the Y-direction moving ring, the zoom switch, and the release base.
Figure 14B:
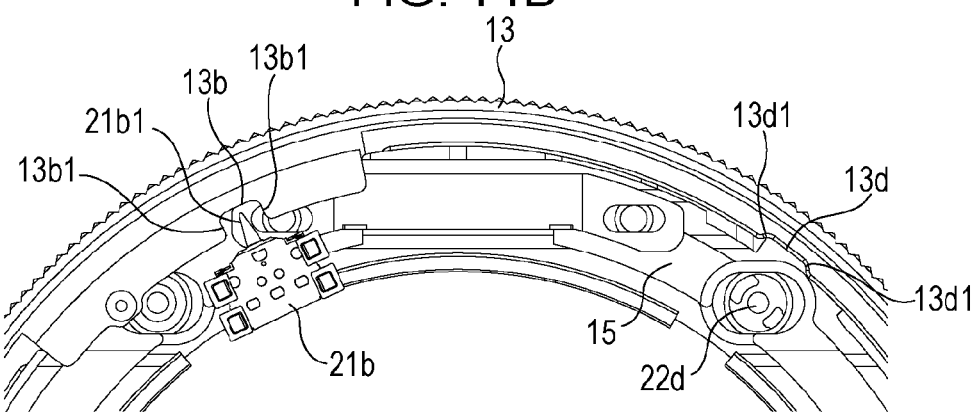
FIG. 14B is an enlarged view of part XIVB of the zoom ring shown in FIG. 14A.
Figure 14C:
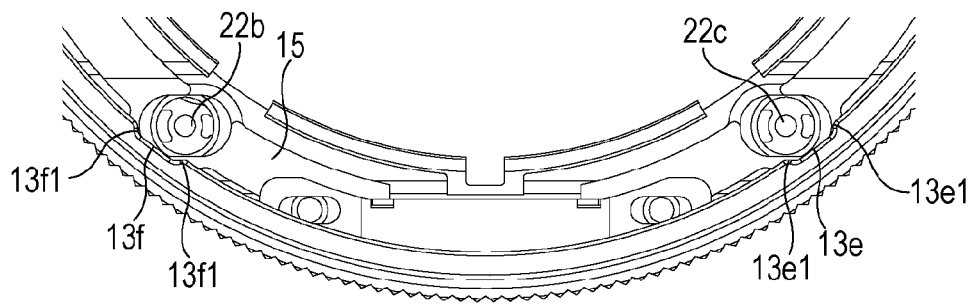
FIG. 14C is an enlarged view of part XIVC of the zoom ring shown in FIG. 14A.

FIGS. 14A to 14C are diagrams illustrating a state in which the release ring 14 is slid in the Y1-direction when the zoom ring 13 is at the neutral position. FIG. 14A is an overall view corresponding to FIG. 12A in a state in which the release ring 14 is slid in the Y1-direction when the zoom ring 13 is at the neutral position. FIG. 14B is an enlarged view of part XIVB, which is the upper part of the zoom ring 13 shown in FIG. 14A. FIG. 14C is an enlarged view of part XIVC, which is the lower part of the zoom ring 13 shown in FIG. 14A.

When the release ring 14 is slid in the Y1-direction, the release base 22 slides in the Y1-direction relative to the zoom ring 13. At that time, as shown in FIG. 14C, the shaft 22b comes into the cutout portion 13f, and the shaft 22c comes into the cutout portion 13e. This allows the release base 22 to be slid in the Y1-direction relative to the zoom ring 13. That is, this permits sliding of the release base 22 in the Y1-direction.

Figure 15A:
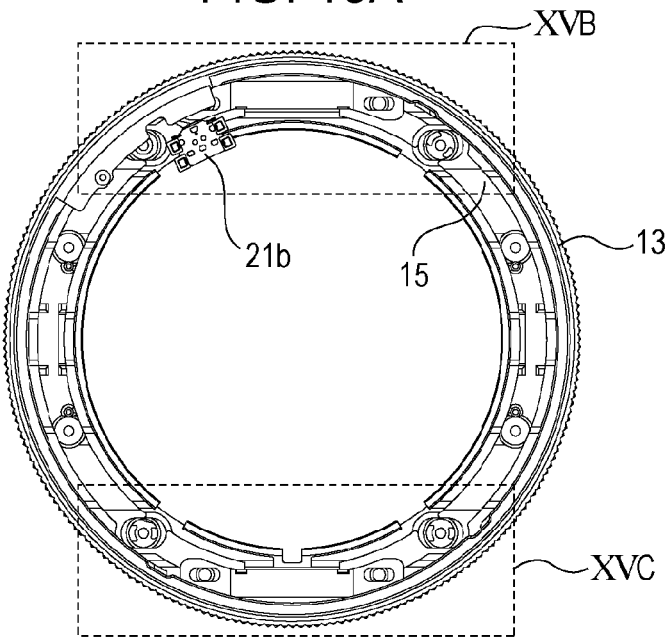
FIG. 15A is an overall view of the zoom ring, the Y-direction moving ring, the zoom switch, and the release base.
Figure 15B:
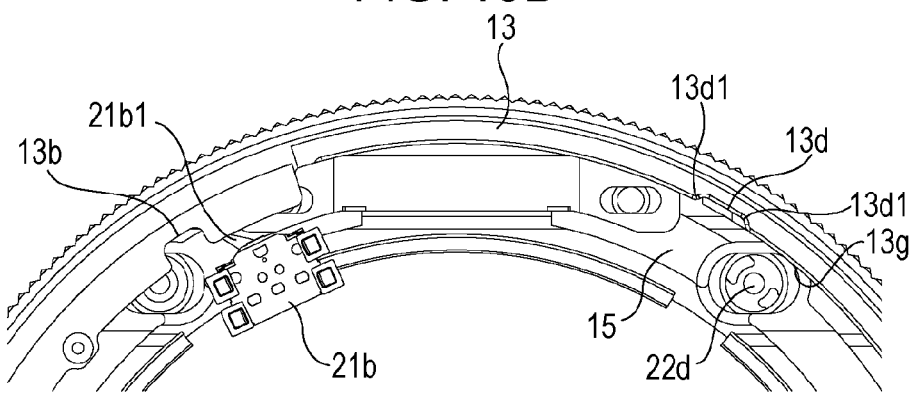
FIG. 15B is an enlarged view of part XVB of the zoom ring shown in FIG. 15A.
Figure 15C:
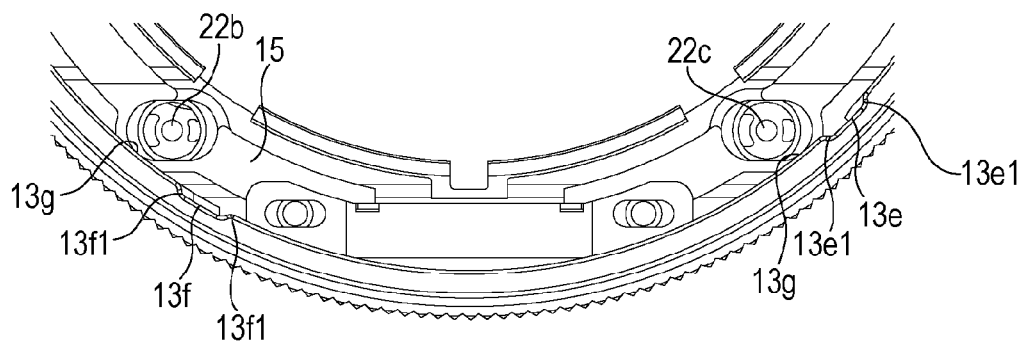
FIG. 15C is an enlarged view of part XVC of the zoom ring shown in FIG. 15A.

FIGS. 15A to 15C are diagrams illustrating a state in which the zoom ring 13 is rotated from the neutral position in the Q-direction to bring the end 13b1 of the cutout portion 13b into contact with the lever 21b1 of the zoom switch 21b, so that the zoom switch 21b outputs a zoom signal. FIG. 15A is an overall view corresponding to FIG. 12A in a state in which the zoom ring 13 is rotated from the neutral position in the Q-direction, and the zoom switch 21b outputs a zoom signal. FIG. 15B is an enlarged view of part XVB, which is the upper part of the zoom ring 13 shown in FIG. 15A. FIG. 15C is an enlarged view of part XVC, which is the lower part of the zoom ring 13 shown in FIG. 15A.

In this state, the shafts 22b, 22c, and 22d are in contact with the inner periphery 13g of the zoom ring 13, as shown in FIGS. 15B and 15C. Accordingly, in the state shown in FIGS. 15A to 15C, the sliding movement of the release base 22 relative to the zoom ring 13 is restricted, so that the release ring 14 cannot be slid in the X-direction or the Y-direction. In other words, in this exemplary embodiment, the sliding operation of the release ring 14 is mechanically restricted in a state in which the zoom ring 13 is rotated, and the zoom switch 21b outputs a zoom signal.

Figure 16A:
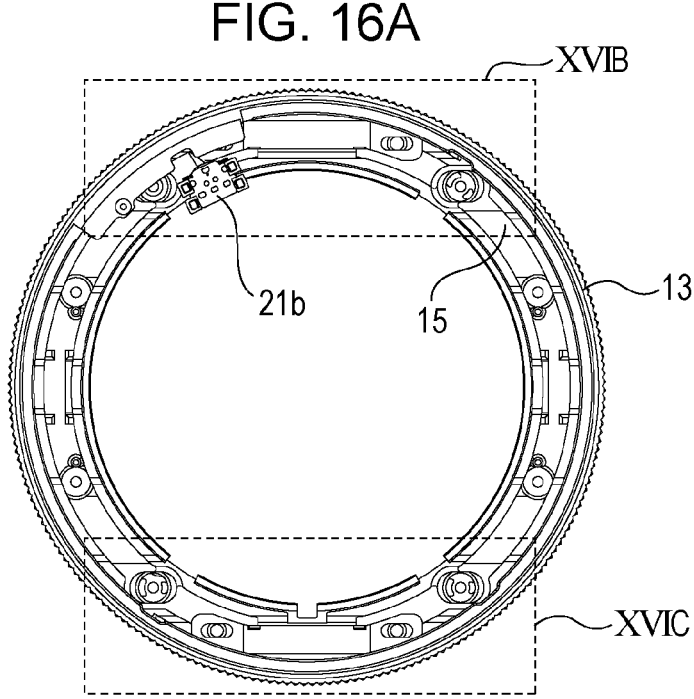
FIG. 16A is an overall view of the zoom ring, the Y-direction moving ring, the zoom switch, and the release base.
Figure 16B:
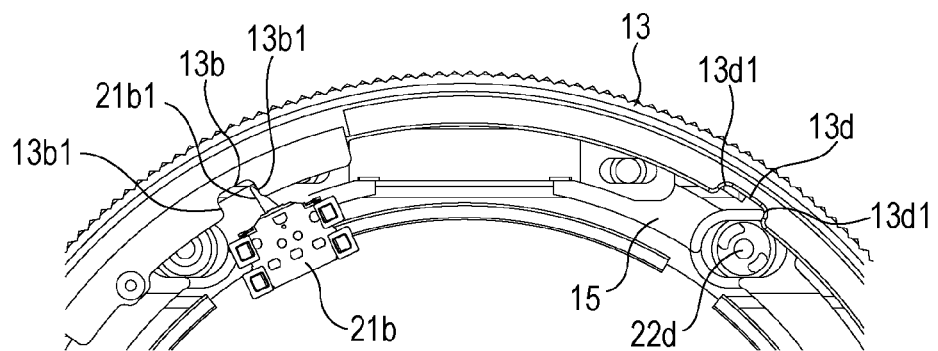
FIG. 16B is an enlarged view of part XVIB of the zoom ring shown in FIG. 16A.
Figure 16C:
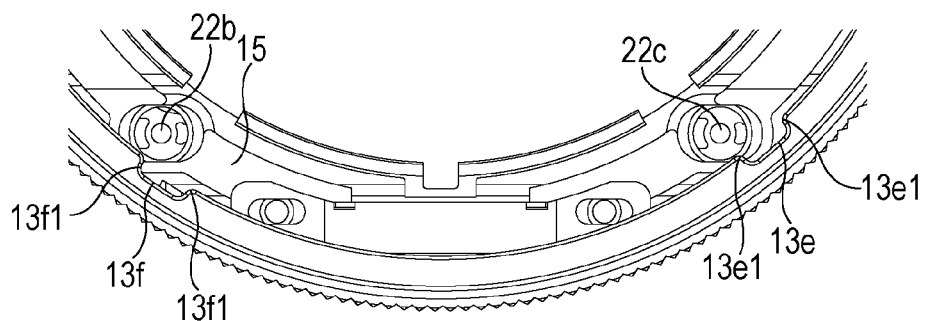
FIG. 16C is an enlarged view of part XVIC of the zoom ring shown in FIG. 16A.

FIGS. 16A to 16C are diagrams illustrating a state in which the zoom ring 13 is rotated from the neutral position in the Q-direction to bring the end 13b1 of the cutout portion 13b into contact with the lever 21b1 of the zoom switch 21b but the zoom switch 21b does not output a zoom signal. FIG. 16A is an overall view corresponding to FIG. 12A in a state in which the zoom ring 13 is rotated from the neutral position in the Q-direction, and the zoom switch 21b does not output a zoom signal. FIG. 16B is an enlarged view of part XVIB, which is the upper part of the zoom ring 13 shown in FIG. 16A. FIG. 16C is an enlarged view of part XVIC, which is the lower part of the zoom ring 13 shown in FIG. 16A.

In this state, the shaft 22d is in contact with an end 13d1 of the cutout portion 13d, as shown in FIG. 16B; the shaft 22b is in contact with an end 13f1 of the cutout portion 13f; and the shaft 22c is in contact with an end 13e1 of the cutout portion 13e, as shown in FIG. 16C.

When the release ring 14 is slid in the X1-direction in this state, the release base 22 slides in the X1-direction relative to the zoom ring 13, so that the shaft 22d pushes the end 13d1 of the cutout portion 13d, and the shaft 22c pushes the end 13e1 of the cutout portion 13e. Since the ends 13d1, 13e1, and 13f1 have a curved shape, the zoom ring 13 is rotated in the P-direction by the force of the shaft 22d to push the end 13d1 and the force of the shaft 22c to push the end 13e1. This causes the shaft 22d to come into the cutout portion 13d, and the shaft 22c to come into the cutout portion 13e. This allows the release base 22 to be slid in the X1-direction relative to the zoom ring 13.

When the release ring 14 is slid in the Y1-direction in the state shown in FIGS. 16A to 16C, the release base 22 slides in the Y1-direction relative to the zoom ring 13, so that the shaft 22d pushes the end 13d1 of the cutout portion 13d. Also in this case, the zoom ring 13 is rotated in the P-direction with the force of the shaft 22d to push the end 13d1, so that the shaft 22d comes into the cutout portion 13d.

Thus, in this exemplary embodiment, the ends 13d1, 13e1, and 13f1 are formed so that, if the zoom switch 21b has not yet output a zoom signal, the zoom ring 13 can be returned to the neutral position by sliding the release ring 14.

MODIFICATION

In the above exemplary embodiment, the urging force of the lower spring unit 50 is set smaller than the urging force of the upper spring unit 50 in consideration of the force acting in the X-direction of the restoring force of the urging spring 32. Alternatively, in a modification, the urging force of the coil spring 52, the urging force of the urging spring 32, and the inclination angle θb of the cam 26b are set so that the urging force of the upper spring unit 50 and the force of the sliding portion 31a to push the cam 26b are substantially equal. This allows the lower spring unit 50 to be eliminated.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-133282, filed Jun. 27, 2014, which is hereby incorporated by reference herein in its entirety.

What is claimed is:

1. An image capturing apparatus comprising:
a lens unit;
a first ring-shaped operating member disposed around the lens unit;
a second ring-shaped operating member disposed around the lens unit;
a base member configured to hold the first ring-shaped operating member and the second ring-shaped operating member, wherein the base member holds the first ring-shaped operating member such that the first ring-shaped operating member can move rectilinearly in a direction perpendicular to an optical axis of the lens unit, and wherein the base member holds the second ring-shaped operating member such that the second ring-shaped operating member can rotate about the optical axis of the lens unit;
a rotation detection unit configured to detect rotation of the second ring-shaped operating member; and
a restricting unit configured to restrict rectilinear movement of the first ring-shaped operating member, wherein when the rotation of the second ring-shaped operating member is not detected by the rotation detection unit, the restricting unit permits rectilinear movement of the first ring-shaped operating member, and when the rotation of the second ring-shaped operating member is detected by the rotation detection unit, the restricting unit restricts the rectilinear movement of the first ring-shaped operating member.

2. The image capturing apparatus according to claim 1, wherein the first ring-shaped operating member is disposed further forward than the second ring-shaped operating member in the optical axis of the lens unit.

3. The image capturing apparatus according to claim 2, wherein an outside diameter of the first ring-shaped operating member is smaller than an outside diameter of the second ring-shaped operating member.

4. The image capturing apparatus according to claim 3, wherein the first ring-shaped operating member moves within the outside diameter of the second ring-shaped operating member in the direction perpendicular to the optical axis.

5. The image capturing apparatus according to claim 1, wherein the first ring-shaped operating member executes a release operation when moved rectilinearly, and the second ring-shaped operating member executes a zooming operation when rotated.

6. An image capturing apparatus comprising:
a lens unit;
a first ring-shaped operating member disposed around the lens unit;
a second ring-shaped operating member disposed around the lens unit; and
a base member configured to hold the first ring-shaped operating member and the second ring-shaped operating member, wherein the base member holds the first ring-shaped operating member such that the first ring-shaped operating member can move rectilinearly in a direction perpendicular to an optical axis of the lens unit, and wherein the base member holds the second ring-shaped operating member such that the second ring-shaped operating member can rotate about the optical axis of the lens unit,
wherein the first ring-shaped operating member has a shaft,
wherein the second ring-shaped operating member has a restricting portion and a cutout portion, the cutout portion being part of the restricting portion,
wherein, when the first ring-shaped operating member is rectilinearly moved when the second ring-shaped operating member is not rotated, the shaft comes into the cutout portion, and
wherein, when the first ring-shaped operating member is rectilinearly moved when the second ring-shaped operating member is rotated, the shaft comes into contact with the restricting portion.

7. The image capturing apparatus according to claim 6, wherein the first ring-shaped operating member is disposed further forward than the second ring-shaped operating member in the optical axis of the lens unit.

8. The image capturing apparatus according to claim 7, wherein an outside diameter of the first ring-shaped operating member is smaller than an outside diameter of the second ring-shaped operating member.

9. The image capturing apparatus according to claim 8, wherein the first ring-shaped operating member moves within the outside diameter of the second ring-shaped operating member in the direction perpendicular to the optical axis.

10. The image capturing apparatus according to claim 6, wherein the first ring-shaped operating member executes a release operation when moved rectilinearly, and the second ring-shaped operating member executes a zooming operation when rotated.

\* \* \* \* \*